United States Patent
Cho et al.

(10) Patent No.: US 11,561,577 B2
(45) Date of Patent: Jan. 24, 2023

(54) ELECTRONIC DEVICE INCLUDING HOUSING AND METHOD FOR MANUFACTURING THE HOUSING

(71) Applicant: Samsung Electronics Co., Ltd., Suwon-si (KR)

(72) Inventors: Chongkun Cho, Suwon-si (KR); Hyeongsam Son, Suwon-si (KR); Changjin Song, Suwon-si (KR); Hyeonwoo Lee, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/344,186

(22) Filed: Jun. 10, 2021

(65) Prior Publication Data

US 2021/0303028 A1    Sep. 30, 2021

Related U.S. Application Data

(63) Continuation of application No. 16/998,432, filed on Aug. 20, 2020, now Pat. No. 11,036,255, which is a
(Continued)

(30) Foreign Application Priority Data

Apr. 13, 2018   (KR) ........................ 10-2018-0043471

(51) Int. Cl.
  *G06F 1/16*    (2006.01)
  *G09F 9/302*   (2006.01)

(52) U.S. Cl.
  CPC .......... *G06F 1/1626* (2013.01); *G06F 1/1605* (2013.01); *G09F 9/302* (2013.01)

(58) Field of Classification Search
CPC combination set(s) only.
See application file for complete search history.

(56) References Cited

U.S. PATENT DOCUMENTS 8,004,835 B2    8/2011  Conti et al.
8,442,593 B1    5/2013  Kwon et al.
(Continued)

FOREIGN PATENT DOCUMENTS

KR   10-2013-0105973 A   9/2013
KR   10-2014-0101240 A   8/2014
(Continued)

OTHER PUBLICATIONS

Korean Office Action dated Mar. 12, 2022, issued in Korean Patent Application No. 10-2018-0043471.
(Continued)

*Primary Examiner* — Lisa Lea-Edmonds
(74) *Attorney, Agent, or Firm* — Jefferson IP Law, LLP

(57) ABSTRACT

An electronic device is provided. The electronic device includes a front plate, a rear plate facing away the front plate, a side member disposed to surround a space defined between the front plate and the rear plate, wherein the side member is coupled to the front plate and the rear plate to define a housing, wherein the side member is at least partially made of a metallic material, a polymer structure located in the space, and a display received in the space to be viewable through the front plat. The rear plate may be seated on the second surface.

20 Claims, 28 Drawing Sheets

Related U.S. Application Data continuation of application No. 16/383,101, filed on Apr. 12, 2019, now Pat. No. 10,768,664.

(56) References Cited

U.S. PATENT DOCUMENTS

| | | | |
|---|---|---|---|
| 9,310,836 B2 | 4/2016 | Srinivas et al. | |
| 9,549,050 B2 | 1/2017 | Choi et al. | |
| 9,699,926 B2 | 7/2017 | Hwang et al. | |
| 9,846,452 B2 | 12/2017 | Pakula et al. | |
| 10,134,540 B2 * | 11/2018 | Choi | H04M 1/0202 |
| 10,205,807 B2 | 2/2019 | Bae et al. | |
| 10,368,457 B2 * | 7/2019 | Pakula | G06F 1/1658 |
| 10,432,768 B2 * | 10/2019 | Choi | H01Q 1/243 |
| 10,484,035 B2 * | 11/2019 | Flores | H04M 1/185 |
| 10,694,013 B2 * | 6/2020 | Lee | H04B 1/3888 |
| 10,768,664 B2 | 9/2020 | Cho et al. | |
| 10,798,849 B2 | 10/2020 | Lee et al. | |
| 11,047,628 B2 | 6/2021 | Lee et al. | |
| 11,202,385 B2 * | 12/2021 | Kim | H01H 13/06 |
| 2009/0168337 A1 * | 7/2009 | Conti | G06F 1/1656 361/679.56 |
| 2011/0050598 A1 | 3/2011 | Park et al. | |
| 2013/0058018 A1 | 3/2013 | Song et al. | |
| 2013/0113348 A1 | 5/2013 | Holben et al. | |
| 2013/0146491 A1 | 6/2013 | Ghali et al. | |
| 2013/0242481 A1 * | 9/2013 | Kim | H04M 1/0249 361/679.01 |
| 2014/0228080 A1 | 8/2014 | Choi et al. | |
| 2014/0268525 A1 | 9/2014 | Hwang et al. | |
| 2015/0279589 A1 * | 10/2015 | Park | H01H 13/186 200/513 |
| 2016/0066412 A1 * | 3/2016 | Choi | G06F 1/1601 361/749 |
| 2016/0086745 A1 * | 3/2016 | Seo | G06F 1/1662 200/51 R |
| 2016/0147264 A1 | 5/2016 | Kil et al. | |
| 2016/0217943 A1 * | 7/2016 | Kim | H01H 13/063 |
| 2016/0254836 A1 | 9/2016 | Alsberg et al. | |
| 2017/0118319 A1 * | 4/2017 | Jun | H04B 1/3827 |
| 2017/0135239 A1 * | 5/2017 | Hyun | H05K 1/14 |
| 2017/0142239 A1 | 5/2017 | Bae et al. | |
| 2018/0033571 A1 * | 2/2018 | Choi | H04M 1/0266 |
| 2018/0299924 A1 | 10/2018 | Seo et al. | |
| 2019/0124780 A1 * | 4/2019 | Wright | B65D 43/00 |
| 2019/0364695 A1 | 11/2019 | Lee et al. | |
| 2020/0116435 A1 | 4/2020 | Lee et al. | |
| 2021/0055059 A1 | 2/2021 | Lee et al. | |
| 2021/0341229 A1 | 11/2021 | Lee et al. | |

FOREIGN PATENT DOCUMENTS

| | | |
|---|---|---|
| KR | 10-2017-0056198 A | 5/2017 |
| KR | 10-2017-0070636 A | 6/2017 |
| KR | 10-2017-0097541 A | 8/2017 |
| KR | 10-2018-0013436 A | 2/2018 |
| KR | 10-2018-0104517 A | 9/2018 |
| WO | 2017/104933 A1 | 6/2017 |
| WO | 2017/142286 A1 | 8/2017 |

OTHER PUBLICATIONS

International Search Report dated Jul. 30, 2019, issued in International Patent Application No. PCT/KR2019/004432.

Extended European Search Report dated Apr. 29, 2021, issued in European Application No. 19786002.6.

Korean Notice of Allowance dated Sep. 27, 2022, issued in Korean Patent Application No. 10-2018-0043471.

* cited by examiner

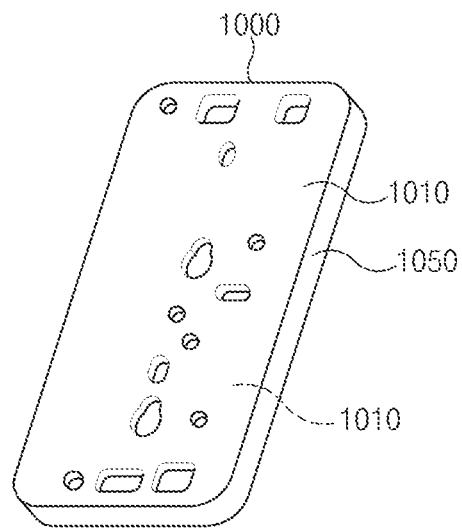
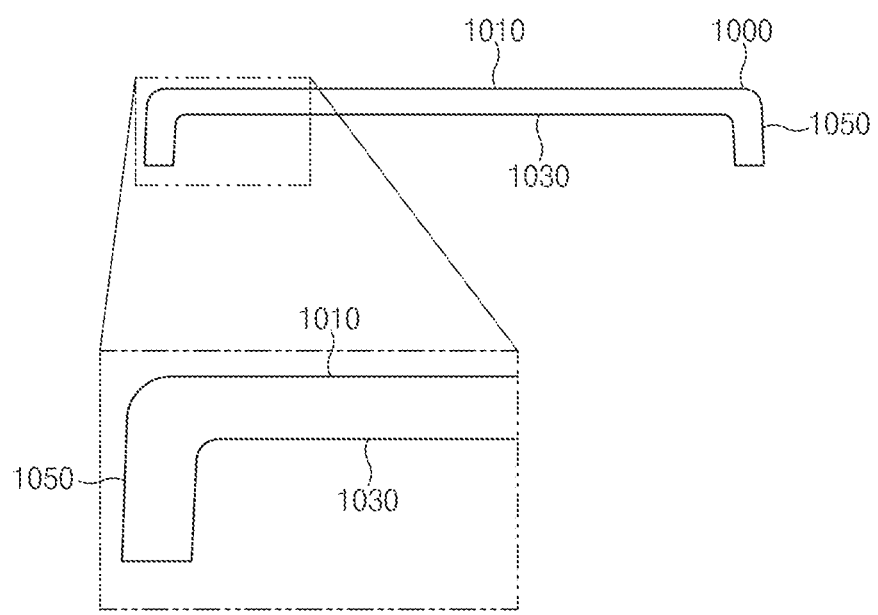
FIG.10A

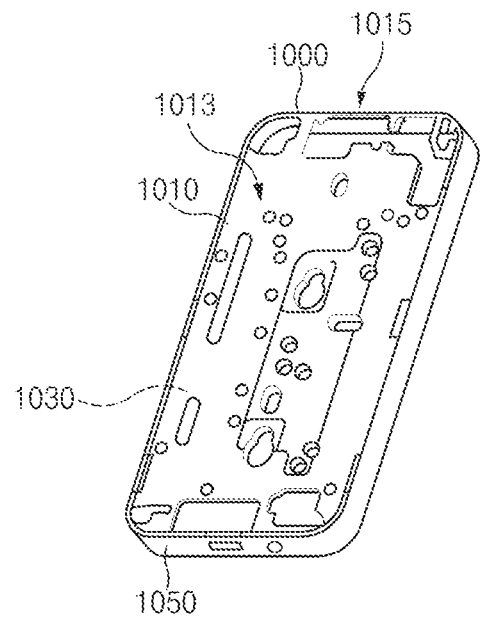
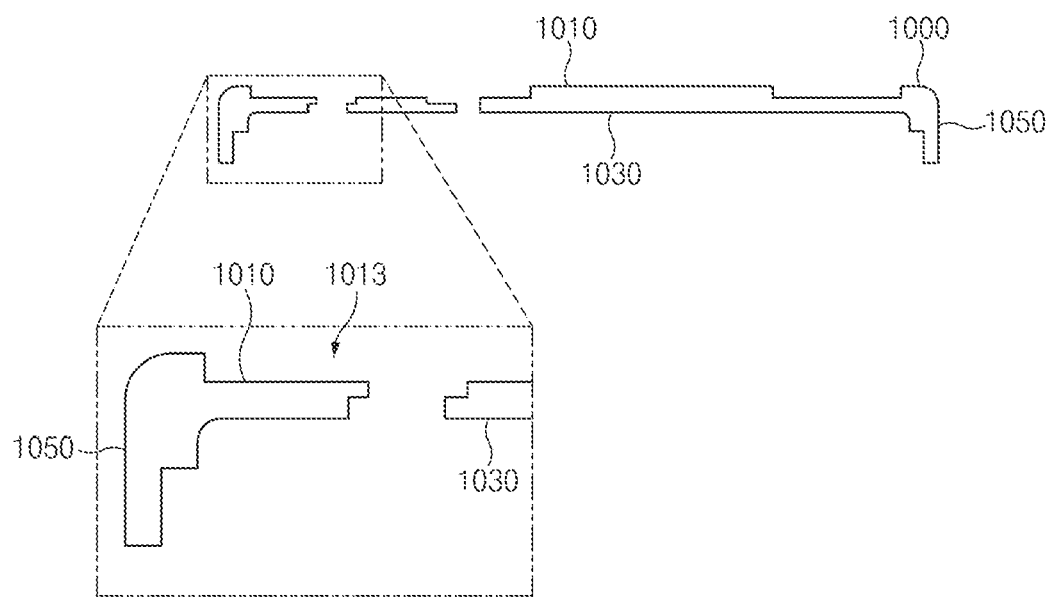
FIG.10E

ELECTRONIC DEVICE INCLUDING HOUSING AND METHOD FOR MANUFACTURING THE HOUSING

CROSS-REFERENCE TO RELATED APPLICATION(S)

This application is a continuation application of prior application Ser. No. 16/998,432, filed on Aug. 20, 2020, which has issued as U.S. Pat. No. 11,036,255 on Jun. 15, 2021, which is a continuation application of prior application Ser. No. 16/383,101, filed on Apr. 12, 2019, which has issued as U.S. Pat. No. 10,768,664 on Sep. 8, 2020 and is based on and claims priority under 35 U.S.C § 119(a) of a Korean patent application number 10-2018-0043471, filed on Apr. 13, 2018, in the Korean Intellectual Property Office, the disclosure of which is incorporated by reference herein in its entirety.

BACKGROUND

1. Field

The disclosure relates to an electronic device including a housing and a method for manufacturing the electric device.

2. Description of Related Art

An electronic device such as a smart phone, and the like may have a housing. The housing may fix and support components of the electronic device, such as a display, a camera module, a printed circuit board, and the like. The printed circuit board on which the components are mounted may be received and fixed inside the housing. Further, a key input device (e.g., a side key button) for user input may be disposed in the housing. In one example, a hole may be defined in a side surface of the housing, and the key input device may be inserted via the hole.

A method for manufacturing the housing may include different methods depending on a presence of a bracket structure. For example, when the bracket structure is not formed in the housing, the housing may be manufactured from a base material having a thickness of approximately 1.6 mm. When the bracket structure is formed in the housing, the housing may be manufactured from a base material having a thickness of approximately 4.8 mm.

The above information is presented as background information only to assist with an understanding of the disclosure. No determination has been made, and no assertion is made, as to whether any of the above might be applicable as prior art with regard to the disclosure.

SUMMARY

The greater the thickness of a base material used to manufacture the housing, the greater the number of machining (e.g., computerized numerical control (CNC)-machining), thereby increasing time and cost for the machining. In addition, as the thickness of the base material increases, a portion that is not to be used further increases, thereby resulting in cost loss.

However, when the thickness of the base material is equal to or smaller than a specific size, the housing may not secure a minimum contact area (or an attachment area) necessary to engage a cover.

Aspects of the disclosure are to address at least the above-mentioned problems and/or disadvantages and to provide at least the advantages described below. Accordingly, an aspect of the disclosure is to provide a method for manufacturing a housing using a base material in a form of a thin plate (thin sheet) having a relatively smaller thickness, and an electronic device including the housing.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate facing in a first direction, a rear plate facing in a second direction opposite to the first direction, and a side member surrounding a space defined between the front plate and the rear plate, wherein the side member is at least partially made of a metallic material, and wherein the side member includes a first surface whose at least a portion substantially faces in the second direction, and at least one trench extending from the first surface toward the front plate, a polymer structure located in the space, wherein the polymer structure defines at least a portion of a sidewall defining the trench, wherein the polymer structure is disposed on the first surface of the side member, and includes a polymer material, and a display received in the space to be viewable through the front plate, wherein the rear plate is seated on the second surface.

In accordance with another aspect of the disclosure, a method for manufacturing a housing of an electronic device is provided. The method includes pressing a base material of a thin plate shape with a press mold, CNC-machining a housing provided from the pressing of the base material at least one time, bonding a polymer member to the housing using an insert injection process, and attaching a rear plate to the polymer member. The housing subjected to the CNC-machining at least one time may include a first surface facing in a first direction, a second surface facing in a second direction opposite to the first direction, and a side member surrounding a space defined between the first surface and the second surface. The side member may include a first surface of which at least a portion substantially faces in the second direction, and at least one trench extending from the first surface toward the first direction. The polymer member may be located in the space, may extend in parallel to the at least one trench to be in contact to at least a portion of the side member, and may include the second surface substantially facing in the second direction. The rear plate may be attached to the second surface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A, 10B, 10C, 10D, 10E, 10F, 10G, 10H, 10I, 10J, and 10K are views for illustrating a manufacturing process of a housing according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
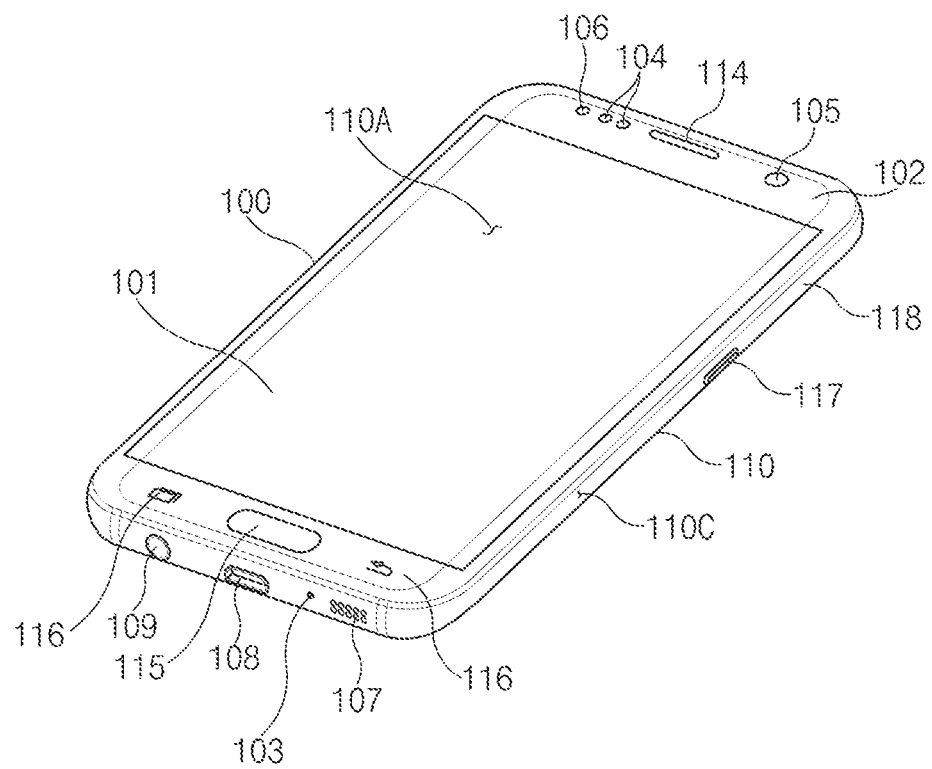
FIG. 1 is a perspective view of a front surface of an electronic device according to an embodiment of the disclosure.
Figure 2:
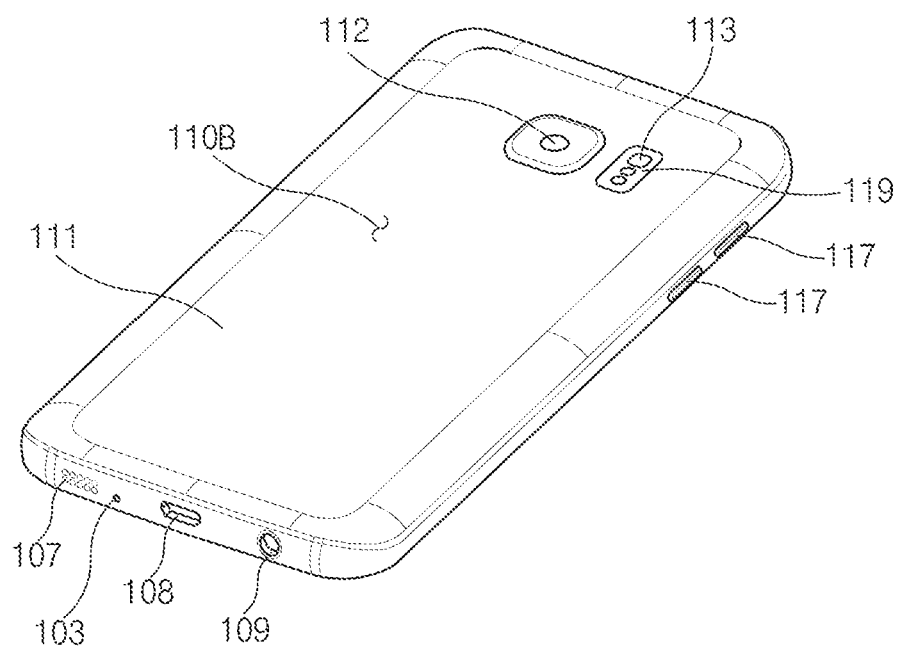
FIG. 2 is a perspective view of a rear surface of the electronic device of FIG. 1 according to an embodiment of the disclosure.
Figure 3:
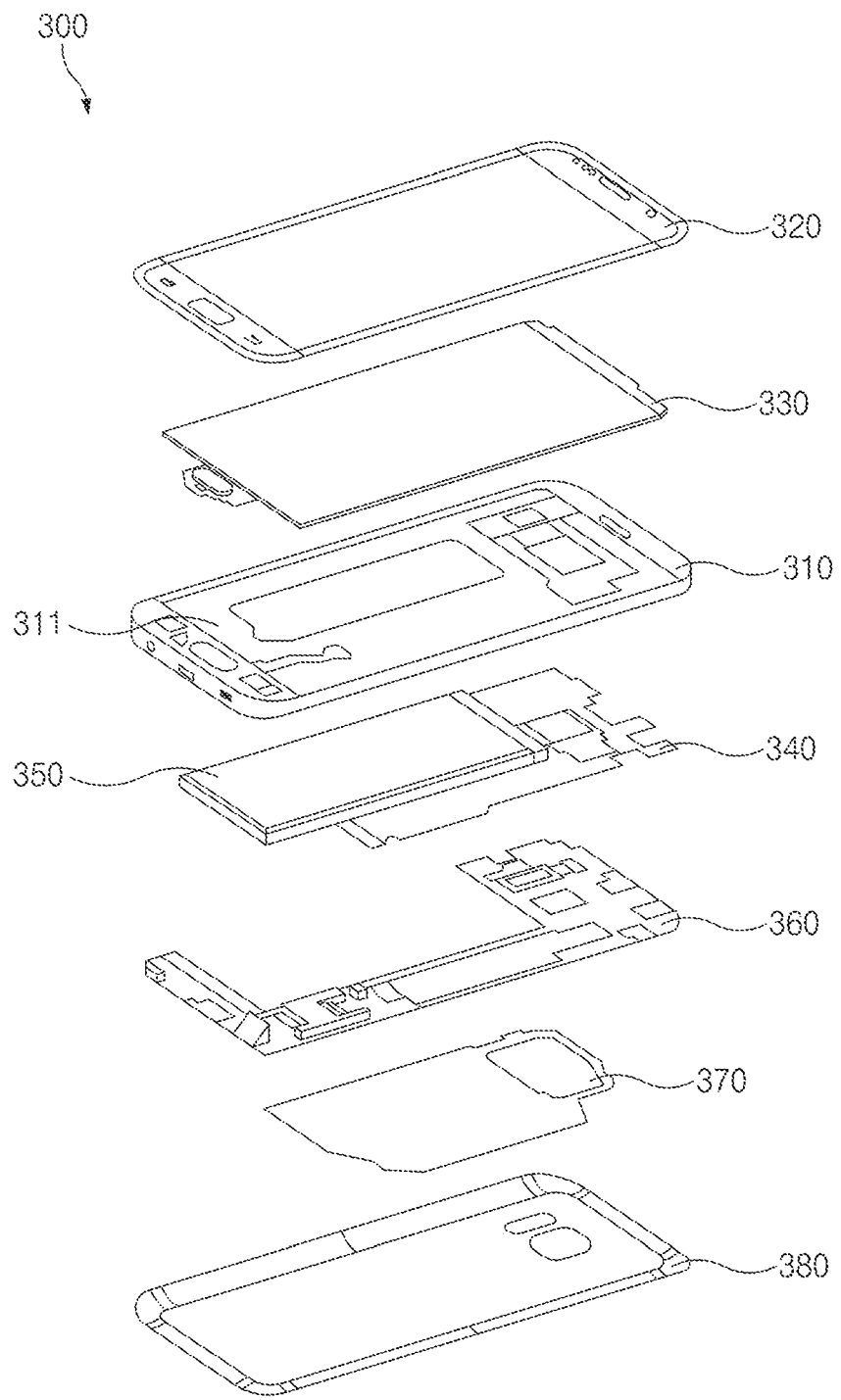
FIG. 3 is an exploded perspective view of the electronic device of FIG. 1 according to an embodiment of the disclosure.

FIG. 1 is a perspective view of a front surface of an electronic device according to an embodiment of the disclosure, and FIG. 2 is a perspective view of a rear surface of the electronic device of FIG. 1 according to an embodiment of the disclosure. FIG. 3 is an exploded perspective view of the electronic device of FIG. 1 according to an embodiment of the disclosure.

Referring to FIGS. 1 and 2, an electronic device 100 according to an embodiment may include a housing 110 including a first surface (or a front surface) 110A, a second surface (or a rear surface) 110B, and a side surface 110C surrounding a space between the first surface 110A and the second surface 110B. In another embodiment (not shown), the housing may refer to a structure that forms portions of the first surface 110A, the second surface 110B, and the side surface 110C of FIG. 1. According to an embodiment, the first surface 110A may be formed by a front plate 102 (e.g., a glass plate, or a polymer plate including various coating layers), at least a portion of which is substantially transparent. The second surface 110B may be formed by a rear plate 111 that is substantially opaque. The rear plate 111 may be formed of, for example, a coated or colored glass, a ceramic, a polymer, a metal (e.g., aluminum, stainless steel (STS), or magnesium), or a combination of at least two of the above-mentioned materials. The side surface 110C may be formed by a side bezel structure (or a "side member") 118 that is coupled to the front plate 102 and the rear plate 111, and includes a metal and/or a polymer. In some embodiments, the rear plate 111 and the side bezel structure 118 may be integrally formed, and may include the same material (e.g., a metal material such as aluminum).

According to an embodiment of the disclosure, the electronic device 100 may include at least one of a display 101, audio modules 103, 107, and 114, sensor modules 104 and 119, camera modules 105, 112, and 113, key input devices 115, 116, and 117, an indicator 106, and connector holes 108 and 109. In some embodiments, the electronic device 100 may omit at least one of the components (e.g., the key input devices 115, 116, and 117, or the indicator 106) or additionally include another component.

The display 101, for example, may be exposed through a substantial portion of the front plate 102. The display 101 may be coupled to or adjacent to a touch sensing circuit, a pressure sensor capable of measuring an intensity (pressure) of a touch and/or a digitizer for sensing a stylus pen in a magnetic field manner.

The audio modules 103, 107, and 114 may include a microphone hole 103 and speaker holes 107 and 114. A microphone for acquiring external sound may be disposed inside the microphone hole 103. In some embodiments, a plurality of microphones may be disposed to sense a direction of the sound. The speaker holes 107 and 114 may include the external speaker hole 107 and the receiver hole 114 for a call. In some embodiments, the speaker holes 107 and 114 and the microphone hole 103 may be implemented as a single hole, or a speaker (e.g., a piezo speaker) may be included without the speaker holes 107 and 114.

The sensor modules 104 and 119 may generate an electrical signal or a data value corresponding to an internal operating state of the electronic device 100, or an external environmental condition. The sensor modules 104 and 119 may include, for example, the first sensor module 104 (e.g., a proximity sensor) disposed on the first surface 110A of the housing 110 and/or a second sensor module (not shown)

(e.g., a fingerprint sensor) and/or the third sensor module 119 (e.g., a heart rate monitor (HRM)) disposed on the second surface 110B of the housing 110. The fingerprint sensor may be disposed not only on the first surface 110A of the housing 110 (e.g., a home key button 115) but also on the second surface 110B. The electronic device 100 may further include a sensor module that is not shown, for example at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or the illuminance sensor 104.

The camera modules 105, 112, and 113 may include the first camera device 105 disposed on the first surface 110A of the electronic device 100, the second camera device 112 and/or the flashlight 113 disposed on the second surface 110B. The camera modules 105 and 112 may include one or more lenses, an image sensor and/or an image signal processor. The flashlight 113 may include, for example, a light emitting diode or a xenon lamp. In some embodiments, the two or more lenses (e.g., a wide-angle lens, and a telephoto lens) and the image sensors may be disposed on one surface of the electronic device 100.

The key input devices 115, 116, and 117 may include a home key button 115 disposed on the first surface 110A of the housing 110, a touch pad 116 disposed around the home key button 115, and/or the side key button 117 disposed on the side surface 110C of the housing 110. In another embodiment, the electronic device 100 may not include some or all of the above-mentioned key input devices 115, 116, and 117. Further, the key input devices 115, 116, 117 that are not included may be implemented in another form such as a soft key, and the like on the display 101.

The indicator 106, for example, may be disposed on the first surface 110A of the housing 110. The indicator 106 may, for example, provide status information of the electronic device 100 in an optical form. Further, the indicator 106 may include an LED.

The connector holes 108 and 109 may include the first connector hole 108 capable of receiving a connector (e.g., a universal serial bus (USB) connector) for transmitting and receiving power and/or data to/from an external electronic device and/or the second connector hole (e.g., an earphone jack) 109 capable of receiving a connector for transmitting and receiving an audio signal to/from the external electronic device.

Referring to FIG. 3, an electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, the electronic device 300 may omit at least one of the components (e.g., the first support member 311, or the second support member 360) or additionally include another component. At least one of the components of the electronic device 300 may be the same as or similar to at least one of the components of the electronic device 100 of FIG. 1 or FIG. 2. Redundant descriptions are omitted below.

The first support member 311 may be disposed within the electronic device 300 and coupled to the side bezel structure 310, or may be integrally formed with the side bezel structure 310. The first support member 311 may be formed of, for example, a metal material and/or a non-metallic (e.g., polymer) material. The display 330 may be coupled to one surface of the first support member 311, and the printed circuit board 340 may be coupled to the other surface thereof. A processor, a memory and/or an interface may be equipped on the printed circuit board 340. The processor may include, for example, at least one of a central processing device, an application processor, a graphics processing device, an image signal processor, a sensor hub processor, or a communication processor.

The memory may include, for example, a volatile memory or a non-volatile memory.

The interface may include, for example, a high definition multimedia interface (HDMI), a USB interface, a secure digital (SD) card interface and/or an audio interface. The interface may, for example, electrically or physically connect the electronic device 300 with the external electronic device, and may include a USB connector, an SD card/multimedia card (MMC) connector, or an audio connector.

The battery 350 is a device for supplying power to the at least one component of the electronic device 300. The battery 350 may include, for example, a non-rechargeable primary battery, a rechargeable secondary battery, or a fuel cell. At least a portion of the battery 350 may be disposed, for example, on substantially coplanar with the printed circuit board 340. The battery 350 may be integrally disposed within the electronic device 100, and may be detachably disposed from the electronic device 100.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, perform short-range communication with the external device, or wirelessly transmit and receive the power required for charging. In another embodiment, an antenna structure may be formed by the side bezel structure 310 and/or a portion of the first support member 311 or a combination thereof.

In an illustrated embodiment, the front plate 320 may include a first planar region facing in a first direction (e.g., an upward direction based on the drawing), and a first curved region formed at a peripheral portion of the first planar region. The rear plate 380 may include a second planar region facing a second direction (e.g., a downward direction based on the drawing) opposite to the first direction, and a second curved region formed at a periphery portion of the second planar region. In this connection, at least portions of the first and second curved regions may be respectively in contact with a portion (e.g., edge) of the side member 310.

Figure 4:
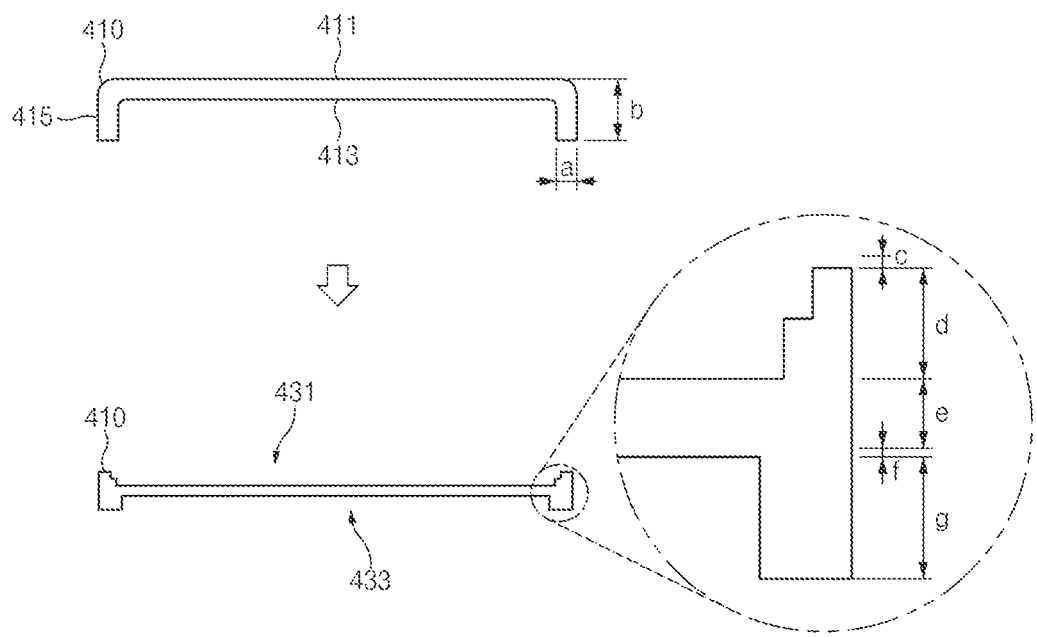
FIG. 4 illustrates a housing according to an embodiment of the disclosure.

FIG. 4 illustrates a housing according to an embodiment of the disclosure.

Referring to FIG. 4, a basic shape of a housing 410 may be realized using a base material of a thin film shape having a relatively small thickness a (e.g., about 3 mm). In one example, when the base material of the thin film shape is pressed by a press mold, as shown in an upper diagram of FIG. 4, the housing 410 may include a front surface 411, a rear surface 413, and a side surface 415. In addition, both side edge regions of the housing 410 may be bent toward the rear surface 413. In this case, a height b of the housing 410 may be defined by the both side edge regions.

The housing 410 subjected to the pressing process, via the computerized numerical control (CNC)-machining, as shown in a lower diagram of FIG. 4, may be provided with a first receiving portion 431 and a second receiving portion 433 respectively on the front surface 411 and the rear surface 413. In the first receiving portion 431, for example, a display and a front plate (e.g., the front plate 102) for covering the display may be received. In addition, in the second receiving portion 433, a printed circuit board (e.g., the printed circuit board 340), a battery (e.g., the battery 350), and a rear plate for covering the battery (the rear plate 380) may be received.

A height d of the first receiving portion 431 may correspond to a sum of a thickness of the display and a thickness of the front plate. According to one embodiment, the height d of the first receiving portion 431 may be about 1.2 mm. A height g of the second receiving portion 433 may correspond to a sum of thicknesses of the printed circuit board and battery that are substantially coplanar and the thickness of the rear plate. In some embodiments, the height g of the second receiving portion 433 may correspond to a sum of thicknesses of the rear case, antenna, and the like as well as the sum of the thicknesses of the printed circuit board, the battery, and the rear plate.

A thickness e+f of a central portion of the housing 410 that is CNC-machined, that is, a thickness between the front surface 411 and the rear surface 413 may include a thickness e required for stably supporting the mounted components and an additional thickness f that may be cut in a process for flattening the rear surface of the housing 410. According to one embodiment, the thickness e required for stably supporting the mounted components may be about 1.1 mm. Further, the additional thickness f that may be cut in the process for flattening the rear surface of the housing 410 may be about 0.3 mm.

According to one embodiment of the disclosure, a height d+e+f+g of the housing 410 that is CNC-machined may be smaller than the height b immediately after the pressing process. For example, in a process of flattening the front surface of the housing 410, a height difference c (e.g., about 0.4 mm) may be generated due to a cut portion.

According to one embodiment of the disclosure, an edge portion of the first receiving portion 431 of the housing 410 may be stepped. For example, in the first receiving portion 431, a horizontal length (or a vertical length) of a first space extending from the front surface 411 of the housing 410 to a first vertical level may be smaller than a horizontal length (or a vertical length) of a second space extending from the first vertical level to a top surface of the first receiving portion 431.

Figure 5:
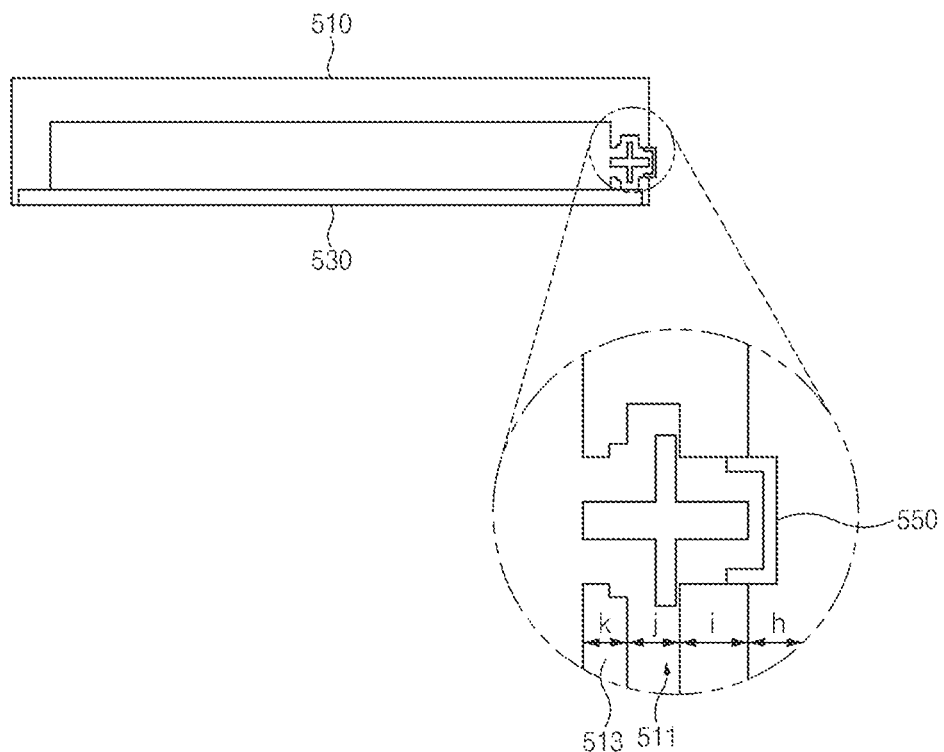
FIG. 5 is a diagram illustrating a housing coupled with a side key button and a rear plate according to an embodiment of the disclosure.

FIG. 5 is a diagram illustrating a housing coupled with a side key button and a rear plate according to an embodiment of the disclosure.

Referring to FIG. 5, a housing 510 (e.g., the housing 410) may be provided with the key input device for user input. For example, a side member of the housing 510 may have a through-hole penetrating from an outer surface to the inner surface, and a side key button 550 may be inserted via the through-hole.

According to one embodiment of the disclosure, a thickness i+j+k of the side member of the housing 510 that is CNC-machined may be smaller than the thickness (a in FIG. 4) immediately after the pressing process. For example, in a process of flattening the side member of the housing 510 and in a profile machining based on a design, a thickness difference h (e.g., about 0.4 mm) may be generated due to a cut portion.

The side key button 550 may include a hook formed of a material such as urethane, and the like. When the side key button 550 is inserted into a through-hole defined in the side member of the housing 510, the side key button 550 may be engaged with a groove defined in the side member of the housing 510. In this case, the side key button 550 may be fixed to the side member of the housing 510. Further, a disassembly groove 511 for disassembling the side key button 550 may be defined in the side member of the housing 510. According to one embodiment, a diameter j of the disassembly groove 511 may be about 1 mm. However, the diameter of the disassembly groove 511 is not limited thereto. According to various embodiments of the disclosure, the diameter of the disassembly groove 511 may be defined to correspond to a diameter of a tool for disassembly.

When the disassembly groove 511 is defined in the side member of the side key button 550, a length i from an outer surface of the housing 510 to the disassembly groove 511 may be about 1 mm for a strength of the housing 510. In addition, a length k from an inner surface of the housing 510 to the disassembly groove 511 may be about 0.6 mm.

When the disassembly groove 511 is defined in the side member of the side key button 550, an area (attachment area) where a rear plate 530 (or an adhesive layer for adhering the rear plate 530 to the housing 510) is brought into contact with the side member of the housing 510 is reduced in a region where the disassembly groove 511 is defined. This is because the area in which the rear plate 530 may be in contact with the side member of the housing 510 is reduced by a space defined by the disassembly groove 511. Consequently, the rear plate 530 may be coupled to an inner region 513 except for the disassembly groove 511 of the side member of the housing 510. However, a thickness k of the inner region 513 may not reach a minimum thickness (e.g., about 1 mm) for the adhesive layer. As a result, in order for the rear plate 530 to stably engage with a portion of the side member of the housing 510 where the disassembly groove 511 is defined, a separate structure may be required for securing the attachment area of the rear plate 530 (or the adhesive layer).

Figure 6:
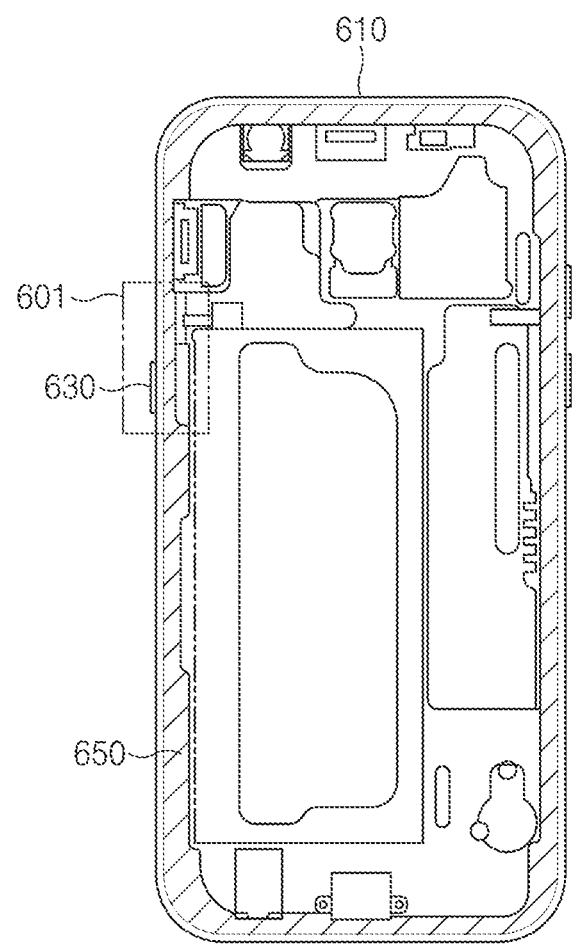
FIG. 6 illustrates a rear view of a housing according to an embodiment of the disclosure.
Figure 7:
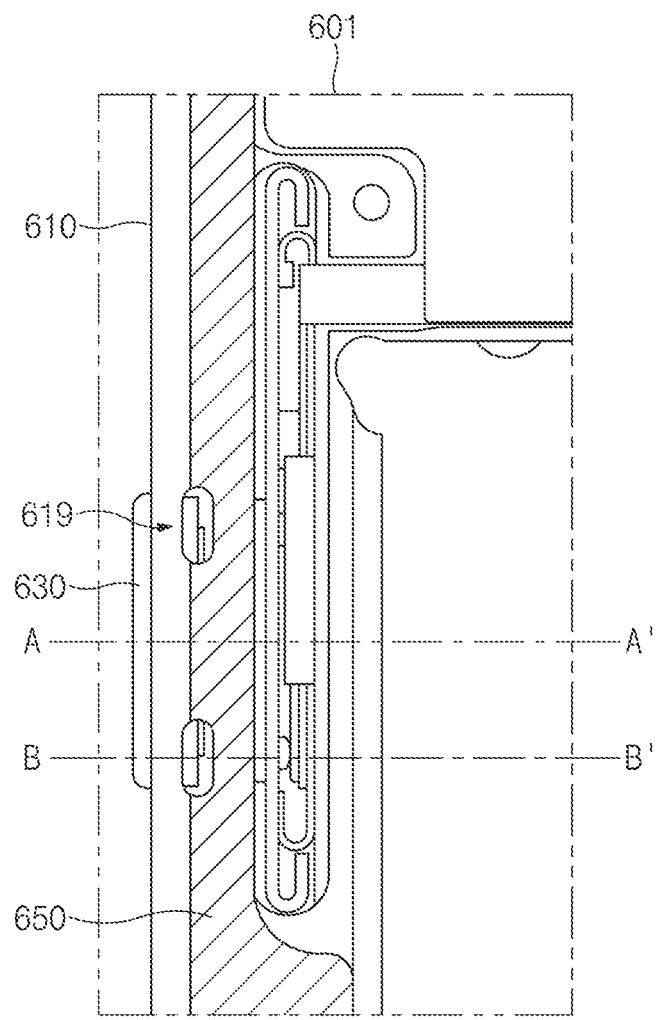
FIG. 7 illustrates a region where a side key button of the housing of FIG. 6 is coupled according to an embodiment of the disclosure.

FIG. 6 illustrates a rear view of a housing according to an embodiment of the disclosure. FIG. 7 illustrates a region where a side key button of the housing of FIG. 6 is coupled according to an embodiment of the disclosure.

Referring to FIGS. 6 and 7, an area where a housing 610 and a rear plate (e.g., the rear plate 530) (or an adhesive layer for coupling the rear plate to the housing 610) are coupled to each other may be secured using an insulator 650 (e.g., a polymer member).

According to one embodiment of the disclosure, when a side key button 630 is disposed in a partial region 601 of a side member of the housing 610, a disassembly groove 619 (e.g., the disassembly groove 511) for separating the side key button 630 from the housing 610 may be provided on the side member of the housing 610. In this case, an attachment area for coupling the side member of the housing 610 and the rear plate (or adhesive layer) may be reduced by an area where the disassembly groove 619 is defined. In order to secure the attachment area, the insulator 650 may further be included on the side member. In one example, a portion facing in a rear surface direction of the side member of the housing 610 may be provided with an injection-molded product having an insulating property. The insulator 650 may be provided in a form of a closed curve (closed loop) along the side member of the housing 610, as shown in FIG. 6.

According to one embodiment of the disclosure, the electronic device (e.g., the electronic device 100) may support a waterproof function, in order to support the waterproof function, a waterproof tape may be used as the adhesive layer to couple the rear plate to the housing 610. However, in terms of the waterproof function, a portion to which the waterproof tape is attached is treated using the same process in order to prevent external moisture from flowing into a fine gap, thereby preventing a generation of fine cracks. In one example, the injection-molded product to which the waterproof tape is attached may be provided using an injection mold process. In another example, the injection-molded product may be prepared using numerical control (NC)-machining. Preparing the injection-molded product using the injection mold process may be advantageous for shortening production time and production cost as compared with a case of preparing the injection-molded product using an NC-machining.

Figure 8A:
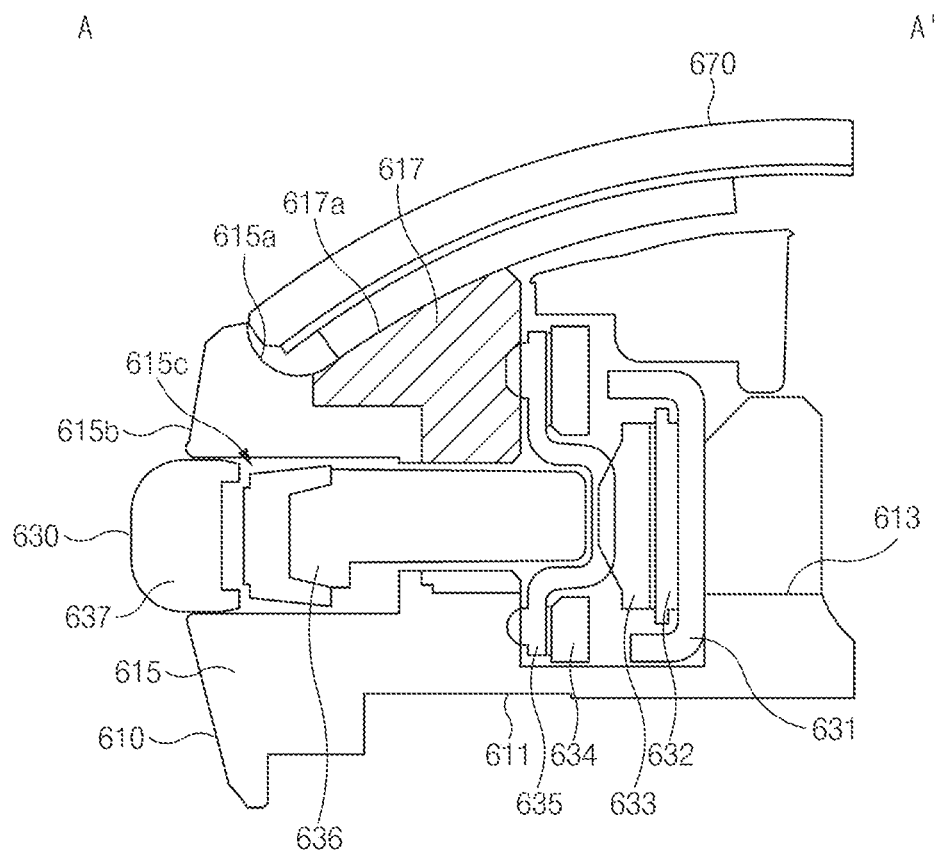
FIGS. 8A and 8B are cross-sectional views taken along line A-A' of FIG. 7, according to an embodiment of the disclosure.
Figure 8B:
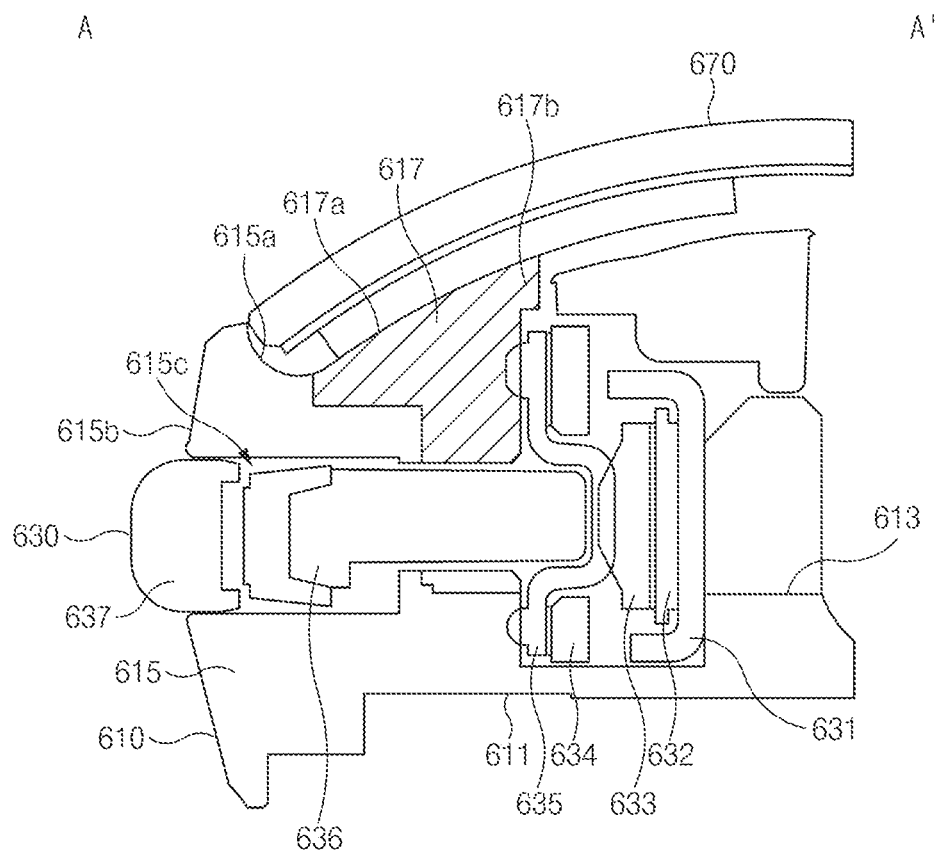

FIGS. 8A and 8B are cross-sectional views taken along line A-A' of FIG. 7, according to an embodiment of the disclosure. FIGS. 8A and 8B are cross-sectional views of a portion where the disassembly groove 619 is not defined of the region 601 where the side key button 630 is disposed on the side member.

Referring to FIGS. 8A and 8B, the housing 610 may include a front plate (e.g., the front plate 102) facing in a front surface direction (first direction), a rear plate 670 facing in a rear surface direction (second direction) opposite to the front surface direction, and a side member 615 surrounding a space between the front plate and the rear plate 670. According to one embodiment of the disclosure, the housing 610 may include a first receiving portion 611 provided between the front plate and the side member 615, and a second receiving portion 613 provided between the rear plate 670 and the side member 615. For example, a display (e.g., the display 101) and the front plate covering the display may be received on the first receiving portion 611. For example, a printed circuit board (e.g., the printed circuit board 340), a battery (e.g., the battery 350), and the rear plate 670 for covering the printed circuit board and the battery may be received on the second receiving portion 613.

According to one embodiment of the disclosure, at least a portion 615b of the side member 615 may be formed of a metal material. The side member 615 may include a first surface 615a that is substantially facing in the rear surface direction (the second direction).

According to one embodiment of the disclosure, a through-hole 615c may be defined in the portion 615b of the side member 615 so as to face a side surface direction (a third direction) from the outer surface of the side member 615 to the space. In this case, a key input device (e.g., the side key button 630) (or a mechanical button structure) may be inserted into the space from the outer surface of the side member 615 through the through-hole 615c.

According to one embodiment of the disclosure, the key input device may include a side key bracket 631, a side key circuit board 632, a switch module 633, a side key sealing bracket 634, a side key sealing rubber 635, a side key molding member 636, and a contact portion 637.

The side key bracket 631 may be provided with a space in which the side key circuit board 632 is seated. The side key bracket 631 may fix and support the side key circuit board 632.

The side key circuit board 632 may be received in the side key bracket 631. According to one embodiment of the disclosure, the side key circuit board 632 may be constituted by a first part that is received in the side key bracket 631 and a second part that extends from the first part and is coupled to a main printed circuit board (e.g., the printed circuit board 340). The first part may include the switch module 633 for generating an electrical signal based on whether the contact portion 637 is pressed. In addition, a connection terminal for transmitting the generated electrical signal to the main printed circuit board may be included in the second part. According to one embodiment of the disclosure, at least a part of the side key circuit board 632 may be implemented with a flexible printed circuit board.

The switch module 633 may generate the electrical signal based on whether the contact portion 637 is pressed or not. For example, when the contact portion 637 is pressed, the side key molding member 363 may be horizontally moved by the contact portion 637, then press the switch module 633 such that the switch module 633 may generate the electric signal. According to one embodiment, the switch module 633 may include a dome switch. The dome switch may include a dome member at least partially having a conductivity and being elastically deformed by an external force, and a terminal unit having at least one switching contact portion for selectively making electrical contact with the dome member when the dome member is elastically deformed.

The side key sealing bracket 634 and the side key sealing rubber 635 may prevent foreign matter or moisture from being introduced from the outside through the through-hole 615c.

When the contact portion 637 is pressed, the side key molding member 636 may be horizontally moved to press the switch module 633. According to one embodiment of the disclosure, the side key molding member 636 may include a urethane material. According to one embodiment of the disclosure, the side key molding member 636 may be made of a material having elasticity of predetermined strength or more. When the side key molding member 636 is made of the material having the elasticity, a following advantage may occur: when the contact portion 637 is pressed by the user, and then the applied pressure is removed, the side key molding member 636 may be horizontally moved to its original position due to an elastic restoring force. In this case, the contact portion 637 may also return to its original position due to the side key molding member 636. Thus, the user may repeatedly press the key input device.

The contact portion 637 may be exposed to the outside through the through-hole 615c. Accordingly, the user may press the contact portion 637 to operate the key input device.

According to one embodiment of the disclosure, an insulator 617 (e.g., a polymer member) may be disposed between the portion 615b of the side member 615 and the space. The rear plate 670 (or an adhesive layer (e.g., a waterproof tape)) may be provided on one surface 617a of the insulator 617 (e.g., a surface where the insulator 617 faces the rear plate 670). In this case, an area of one surface 617a of the insulator 617 may have a size at which the rear plate 670 (or the adhesive layer) may be stably adhered thereto. In one example, the one surface 617a of the insulator 617 may have a length of 1 mm or more in the side surface direction.

According to one embodiment of the disclosure, a top portion of the insulator 617 may include a portion 617b protruding in a side surface direction. In one example, as shown in FIG. 8B, the top right portion 617b of the insulator 617 may protrude in a right direction. The protruding portion 617b of the insulator 617 may provide an additional attachment area such that the rear plate 670 (or the adhesive layer) may be stably adhered thereto.

According to one embodiment of the disclosure, the one surface 617a of the insulator 617 may include a curved surface. In one example, the one surface 617a of the insulator 617 may include a curved surface protruding in a rear surface direction.

Figure 8C:
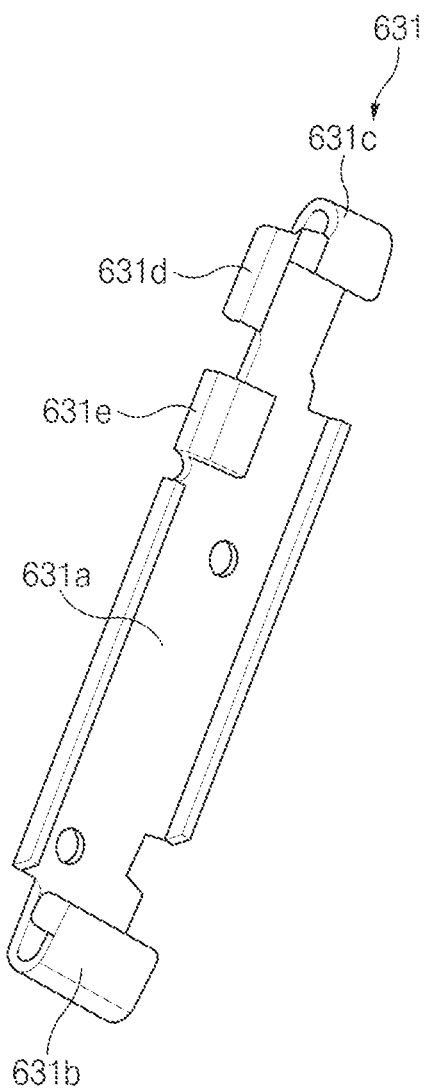
FIG. 8C is a diagram illustrating a side key bracket of a key input device according to an embodiment of the disclosure.
Figure 8D:
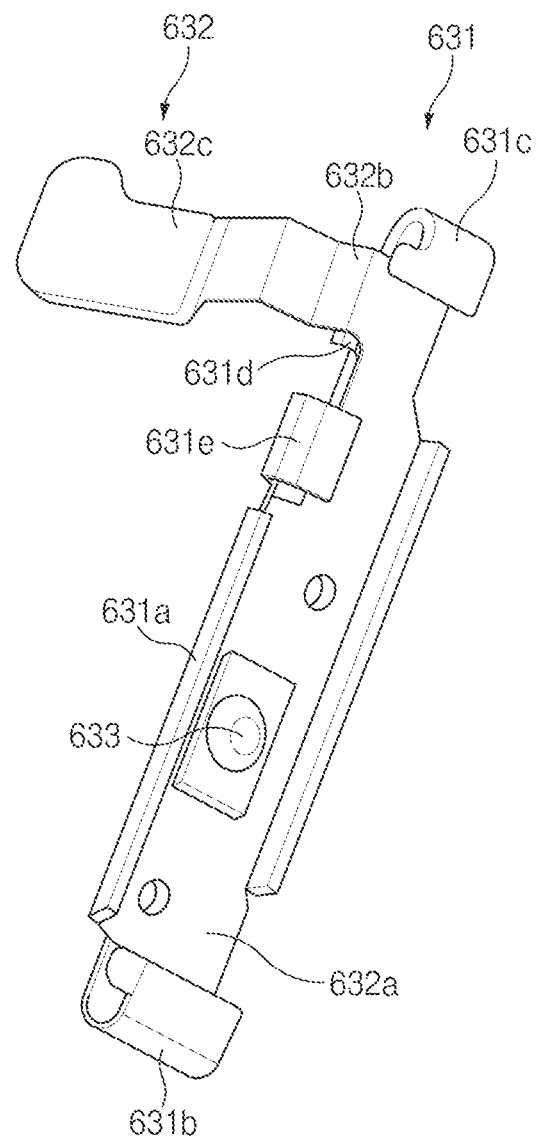
FIG. 8D illustrates a state in which a side key circuit board is mounted on a side key bracket according to an embodiment of the disclosure.

FIG. 8C is a diagram illustrating a side key bracket of a key input device according to an embodiment of the disclosure. FIG. 8D illustrates a state in which a side key circuit board mounted on a side key bracket according to an embodiment of the disclosure.

Referring to FIGS. 8C and 8D, the side key bracket 631 may provide a space in which the side key circuit board 632 may be received, and stably fix and support the side key circuit board 632. According to one embodiment of the disclosure, at least a portion of the side key bracket 631 may be made of a material (e.g., a SUS material) of a determined strength or greater.

The side key bracket 631 may include a central portion 631a, a first edge portion 631b, a second edge portion 631c, a guide portion 631d, and a latch portion 631e. The central portion 631a may be provided in a form of an elongated plate. In addition, the central portion 631a may be formed in a shape in which both side edges in a width direction are bent in a height direction. Thus, the central portion 631a may prevent the side key circuit board 632 from moving and deviating in the width direction when the side key circuit board 632 is received. A first part 632a of the side key circuit board 632 may be received on the central portion 631a of the side key bracket 631.

The first edge portion 631b may be coupled to a longitudinal left side of the central portion 631a, and the second edge portion 631c may be coupled to a longitudinal right side of the central portion 631a. The first edge portion 631b and the second edge portion 631c may be provided in a hook shape. For example, the first edge portion 631b and the second edge portion 631c may extend from the longitudinal left and right sides of the central portion 631a and bent such that end portions thereof may extend in a central portion direction of the central portion 631a. According to one embodiment, the bent portions of the first edge portion 631b and the second edge portion 631c may have a curved shape protruding to the longitudinal left and right sides. According to one embodiment of the disclosure, the first edge portion 631b and the second edge portion 631c may be fastened to the housing 610.

The guide portion 631d may be formed in a portion of a width directional edge of the central portion 631a. In the illustrated drawing, the guide portion 631d is formed at a right end in the longitudinal direction of the central portion 631a among the width directional edges of the central portion 631a. The guide portion 631d may guide a connection portion 632b connecting the first part 632a and a second part 632c of the side key circuit board 632 to be aligned. For example, a position of the connection portion 632b may be guided such that the second part 632c of the side key circuit board 632 may be positioned in a direction of a main printed circuit board (e.g., the printed circuit board 340). According to one embodiment of the disclosure, the connection portion 632b of the side key circuit board 632 may be bent in a direction from the first part 632a toward the main printed circuit board starting from the guide portion 631d.

The latch portion 631e may extend in a height direction from a portion of the width directional edges, and may be bent in a central portion direction of the central portion 631a to be extended by a predetermined length. For example, the latch portion 631e may be provided in a hook shape at the portion of the width directional edges of the central portion 631a. The latch portion 631e may prevent the side key circuit board 632 from moving and deviating in the height direction when the side key circuit board 632 is received on the side key bracket 631.

The side key circuit board 632 may include the first part 632a that is received on the central portion 631a of the side key bracket 631, the second part 632c that is coupled to the main printed circuit board (e.g., the printed circuit board 340), and a connection part 632b connecting the first part 632a and the second part 632c. The first part 632a may be provided with the switch module 633 for generating an electric signal based on whether the contact portion 637 is pressed. The second part 632c may be provided with a connection terminal for transmitting the electric signal generated from the switch module 633 to the main printed circuit board.

Figure 8E:
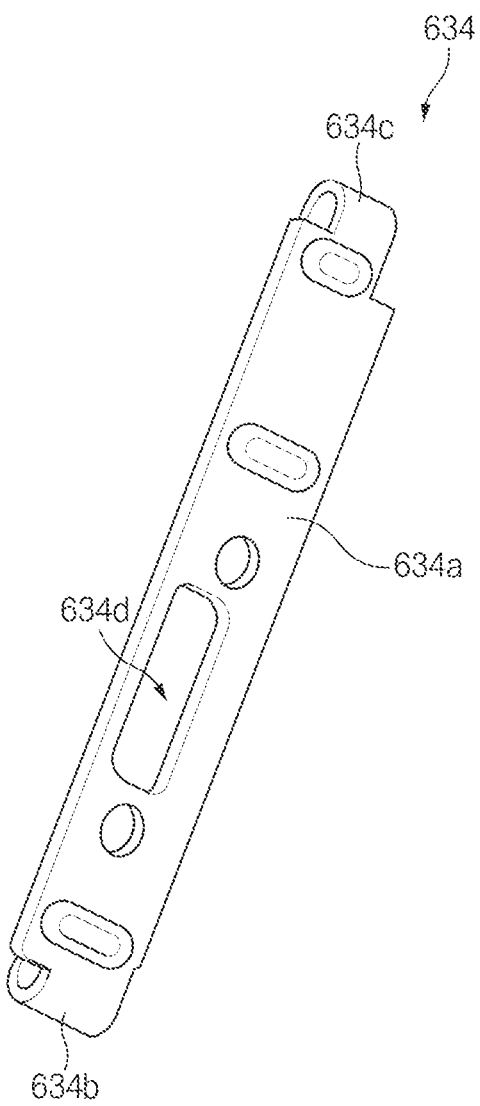
FIG. 8E is a diagram illustrating a side key sealing bracket of a key input device according to an embodiment of the disclosure.
Figure 8F:
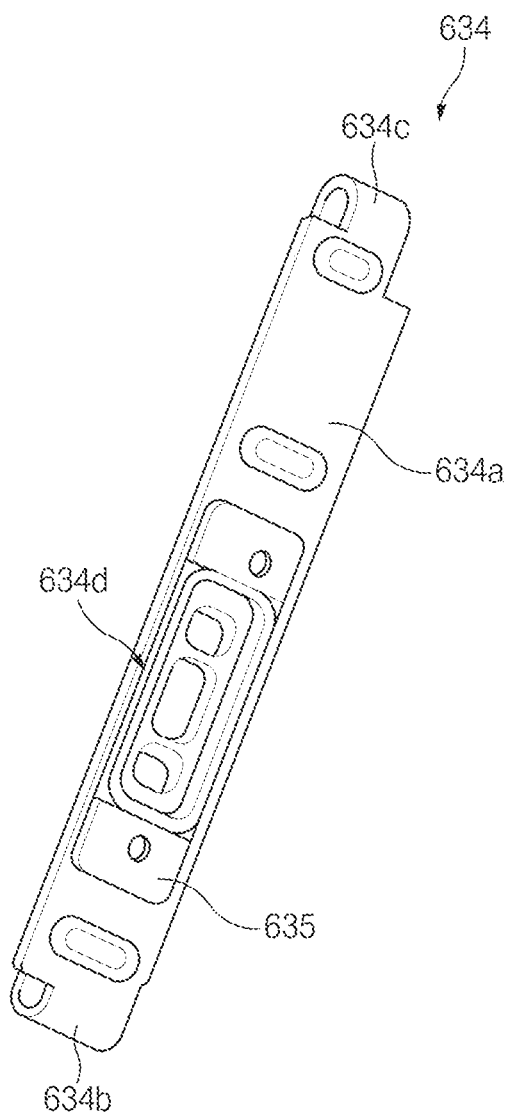
FIG. 8F illustrates a state in which a side key sealing ring rubber is coupled to a side key sealing bracket according to an embodiment of the disclosure.

FIG. 8E is a diagram illustrating a side key sealing bracket of a key input device according to an embodiment of the disclosure. FIG. 8F illustrates a state in which a side key sealing ring rubber is coupled to a side key sealing bracket according to an embodiment of the disclosure.

Referring to FIGS. 8E and 8F, when the key input device (e.g., the side key button 630) (or a mechanical button structure) is inserted into the through-hole 615c defined in the side member 615, the side key sealing bracket 634 and the side key sealing rubber 635 may prevent foreign matter or moisture from being introduced from the outside through the through-hole 615c.

The side key sealing bracket 634 may include a body portion 634a, a first fastening portion 634b, and a second fastening portion 634c. The body portion 634a may be provided in a shape of an elongated plate. Further, the body portion 634a may be defined with at least one opening 634d penetrating one surface of the body portion 634a such that the side key sealing rubber 635 may be engaged therethrough. For example, a protruding structure formed on the side key sealing rubber 635 may be press-fitted into the at least one opening 634d and be fixed.

The first fastening portion 634b may be coupled to a longitudinal left side of the body portion 634a, and the second fastening portion 634c may be coupled to a longitudinal right side of the body portion 634a. The first fastening portion 634b and the second fastening portion 634c may be provided in a hook shape. For example, the first fastening portion 634b and the second fastening portion 634c may extend from the longitudinal left and right sides of the body portion 634a and bent such that end portions thereof may extend in a central portion direction of the body portion 634a. According to one embodiment, the bent portions of the first and second fastening portions 634b and 634c may have a curved shape protruding to the longitudinal left and right sides of the body portion 634a. According to one embodiment of the disclosure, the first fastening portion 634b and the second fastening portion 634c may be fastened to the housing 610.

Figure 8G:
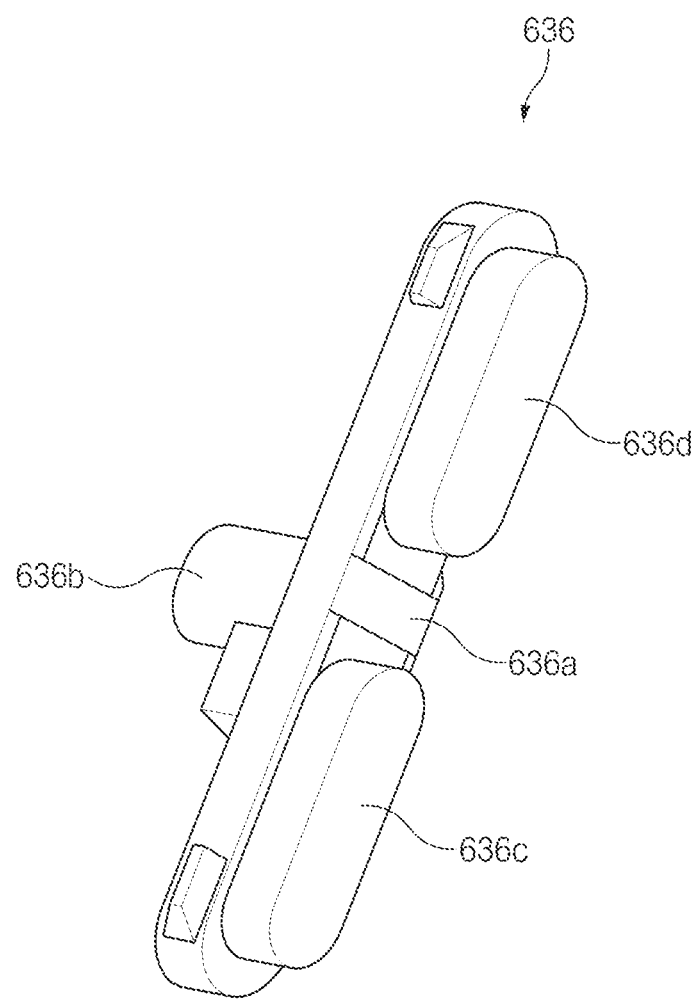
FIG. 8G illustrates a side key molding member of a key input device according to an embodiment of the disclosure.
Figure 8H:
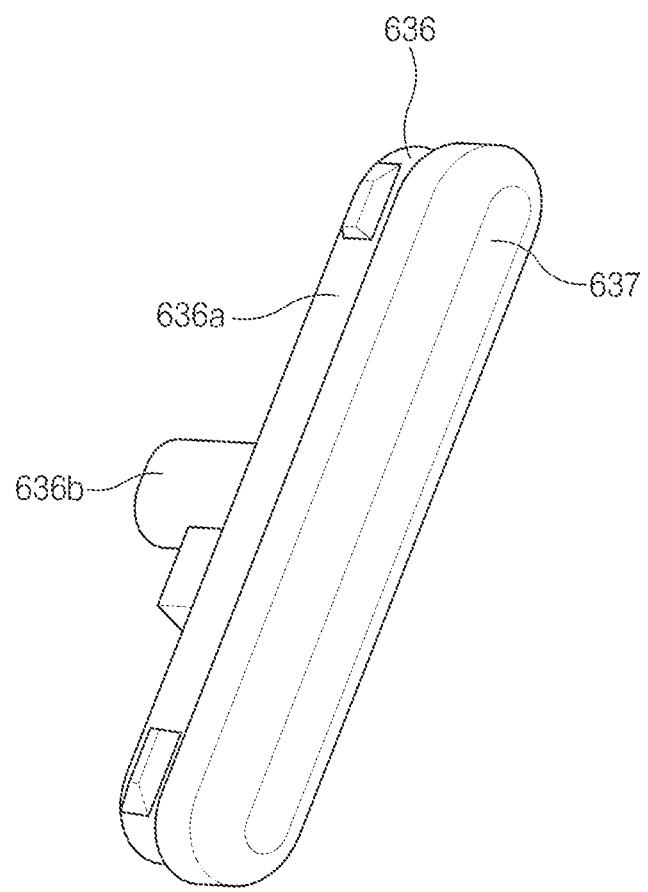
FIG. 8H is a diagram illustrating a state in which a contact portion is coupled to a side key molding member according to an embodiment of the disclosure.

FIG. 8G illustrates a side key molding member of a key input device according to an embodiment of the disclosure. FIG. 8H is a diagram illustrating a state in which a contact portion is coupled to a side key molding member according to an embodiment of the disclosure.

Referring to FIGS. 8G and 8F, the side key molding member 636 may include a support portion 636a, at least one engagement portion (e.g., a first engagement portion 636c or a second engagement portion 636d), and a pressing portion 636b. The support portion 636a may provide a space in which the contact portion 637 may be received. The support portion 636a may be provided such that a shape of a portion thereof facing the contact portion 637 corresponds to a shape of a portion of the contact portion 637 facing the support portion 636a. For example, when the contact portion 637 is provided in an elliptical columnar shape, and the portion thereof facing the support portion 636a is in an elliptical shape, a surface of the support portion 636a facing the contact portion 637 may be in an elliptical shape.

The at least one engagement portion (e.g., the first engagement portion 636c or the second engagement portion 636d) may be formed on the one surface of the support portion 636a facing the contact portion 637. The at least one engagement portion may be provided in a shape protruding from the one surface of the support portion 636a. In the illustrated drawing, the first engagement portion 636c is formed on a left side of the support portion 636a and the second engagement portion 636d is formed on a right side of the support portion 636a. The at least one engagement portion may be engaged with the contact portion 637. According to one embodiment, the at least one engagement portion may be press-fitted into a depression defined in the one surface of the contact portion 637 and be fixed.

The pressing portion 636b may be formed protruding from one surface of the support portion 636a. For example, the pressing portion 636b may be provided on a surface opposite to the surface of the support portion 636a facing the contact portion 637, in a shape protruding by a predetermined length. When the contact portion 637 is pressed, the side key molding member 636 may horizontally move inward of the housing 610, and the pressing portion 636b of the side key molding member 636 may press the switch module 633.

According to one embodiment of the disclosure, the side key molding member 636 may be provided in a double injection molding manner. Further, the side key molding member 636 may be formed of a urethane material. According to one embodiment, the contact portion 637 may be formed of an aluminum material.

Figure 9A:
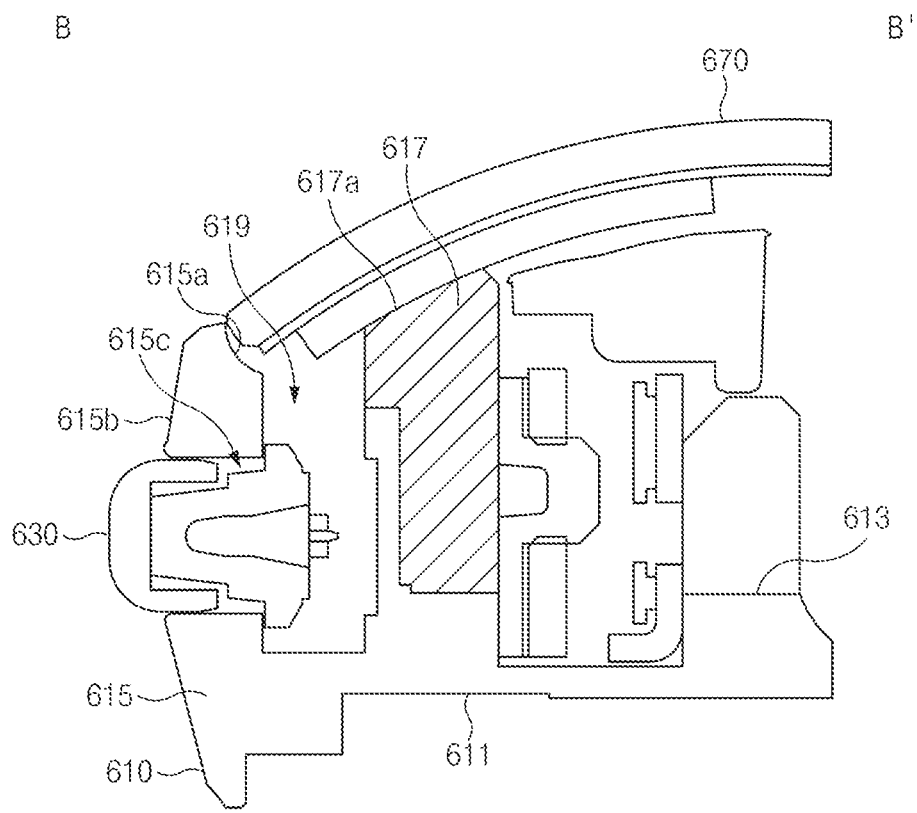
FIGS. 9A and 9B are cross-sectional views taken along a line B-B' of FIG. 7, according to an embodiment of the disclosure.
Figure 9B:
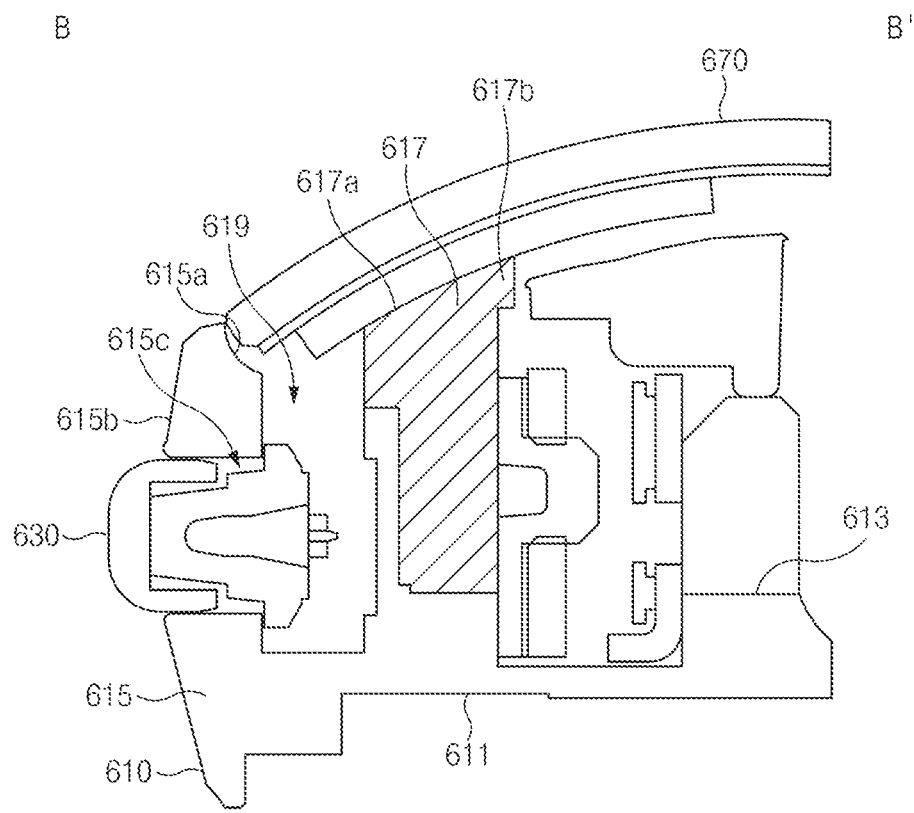

FIGS. 9A and 9B are cross-sectional views taken along a line B-B' of FIG. 7, according to an embodiment of the disclosure. FIGS. 9A and 9B are cross-sectional views of a portion in which the disassembly groove 619 is defined among the region 601 where the side key button 630 is disposed on the side member.

Referring to FIGS. 9A and 9B, the housing 610 may include the front plate (not shown) facing in the front surface direction (the first direction), the rear plate 670 facing in the rear surface direction (the second direction) opposite to the front surface direction, and the side member 615 surrounding the space between the front plate and the rear plate 670.

According to one embodiment of the disclosure, at least the portion 615b of the side member 615 may be formed of a metal material. The portion 615b of the side member 615 may include the first surface 615a substantially facing in the rear surface direction (the second direction) and the at least one disassembly groove 619 (or a trench) from the first surface 615a toward the front plate. In addition, the portion 615b of the side member 615 may include a first portion between the at least one disassembly groove 619 and an outer surface of the side member 615, a second portion between the at least one disassembly groove 619 and the space, the through-hole 615c defined in the first portion so as to face the side surface direction (the third direction) from the outer surface of the side member 615 to the at least one disassembly groove 619, and a depression defined in the second portion from the at least one disassembly groove 619 to face in the side surface direction.

According to one embodiment of the disclosure, the key input device (e.g., the side key button 630) (or the mechanical button structure) may be inserted from the outer surface of the side member 615 through the through-hole 615c into the at least one disassembly groove 619. That is, the key input device may extend through the through-hole 615c and the at least one disassembly groove 619.

According to one embodiment of the disclosure, the insulator 617 (e.g., the polymer member) may be disposed in the space. In one example, the insulator 617 may be located in the space, and is extended in parallel with the at least one disassembly groove 619 to be in contact with the portion of the side member 615. Generally, the insulator 617 may include one surface 617a facing in the rear surface direction (the second direction). According to one embodiment of the disclosure, the one surface 617a of the insulator 617 may include a curved surface protruding in the rear surface direction.

According to one embodiment of the disclosure, the rear plate 670 (or the adhesive layer (the waterproof tape)) may be attached to the one surface 617a of the insulator 617. In this case, an area of the one surface 617a of the insulator 617 may have a size such that the rear plate 670 (or the adhesive layer) may stably adhere thereto. In one example, the one surface 617a of the insulator 617 may have a length of 1 mm or greater in the side surface direction.

According to one embodiment of the disclosure, the top portion of the insulator 617 may include the portion 617b protruding in the side surface direction. In one example, as shown in FIG. 9B, the top right portion 617b of the insulator 617 may protrude in the right direction. The protruding portion 617b of the insulator 617 may provide the additional attachment area such that the rear plate 670 (or the adhesive layer) may be stably adhered thereto.

The electronic device according to the embodiments disclosed herein may include a front plate, a rear plate facing away the front plate, a side member disposed to surround a space defined between the front plate and the rear plate, wherein the side member is coupled to the front plate and the rear plate to define a housing, wherein the side member is at least partially made of a metallic material, wherein the side member has a first surface facing the front plate, a second surface facing the rear plate, and a trench defined in the second surface and facing the first surface, a polymer structure located in the space, wherein the polymer structure defines at least a portion of a sidewall defining the trench, wherein the polymer structure is disposed on the first surface of the side member, and includes a polymer material, and a display received in the space to be viewable through the front plate, wherein the rear plate is seated on the second surface.

In various embodiments, the electronic device may further include an adhesive layer in contact with the second surface and the rear plate while being positioned between the second surface and the rear plate.

In various embodiments, the adhesive layer may include a waterproof tape.

In various embodiments, the side member may include a first portion between the trench and an outer surface of the side member, a second portion between the trench and the space, a through-hole in the first portion, and penetrating from the outer surface of the side member to the trench, and a depression defined in the second portion, and depressed in a direction toward the space.

In various embodiments, the electronic device may further include a mechanical button structure passing through the through-hole and partially extending into the trench.

In various embodiments, the mechanical button structure may be constructed such that the at least a portion of the mechanical button is movable in a direction from the through-hole toward the trench or vice versa.

In various embodiments, the mechanical button structure may be inserted into the at least one trench from the outer surface of the side member through the through-hole.

In various embodiments, the polymer structure may form a closed loop along the side member within the space.

In various embodiments, the electronic device may further include a middle plate positioned between the display and the rear plate, and disposed in parallel with the rear plate.

In various embodiments, the middle plate may be formed of the same material as the side member, and may be integrally formed with the side member.

In various embodiments, the polymer structure may be in contact with the middle plate.

In various embodiments, the front plate may include a first planar region facing in a first direction and a first curved region formed at a periphery of the first planar region. The rear plate may include a second planar region facing in a second direction opposite to the first direction and a second curved region formed at a periphery of the second planar region. A maximum thickness of the side member in a third direction perpendicular to the first direction may be greater than a maximum thickness of the middle plate.

In various embodiments, the rear plate may be formed of glass.

In various embodiments, the polymer structure may include a curved surface having a curvature corresponding to a curvature of the second curved region such that the rear plate is received therein.

FIGS. 10A, 10B, 10C, 10D, 10E, 10F, 10G, 10H, 10I, 10J, and 10K are views for illustrating a manufacturing process of a housing according to an embodiment of the disclosure. The manufacturing process of a housing 1000 may be performed sequentially from a process of FIG. 10A to a process of FIG. 10K.

Figure 10B:
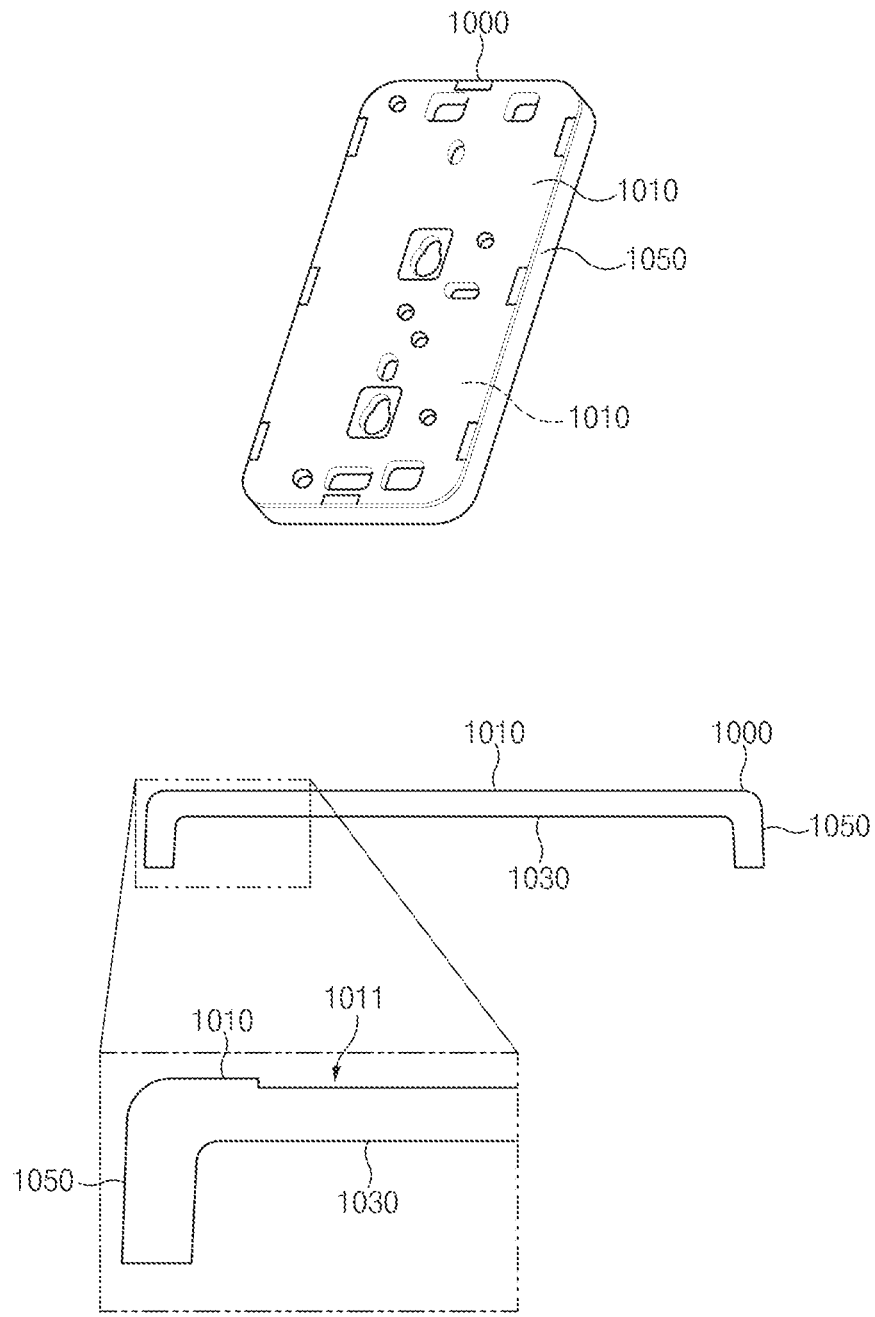

Referring to FIGS. 10A to 10K, the housing 1000 may be implemented in a basic shape using a base material in a thin film shape having relatively small thickness (e.g., about 3 mm). For example, when the base material of the thin plate shape is pressed by a press mold, as shown in FIG. 10A, the housing 1000 may have a front surface 1010, a rear surface 1030, and a side surface 1050. Further, both edge regions may have a shape bent in a direction of the rear surface 1030.

The front surface 1010 of the housing 1000 subjected to the pressing process may be surface milled using CNC-machining, as shown in FIG. 10B. This may be an initial machining step for securing a reference surface 1011 for a subsequent CNC-machining.

Figure 10C:
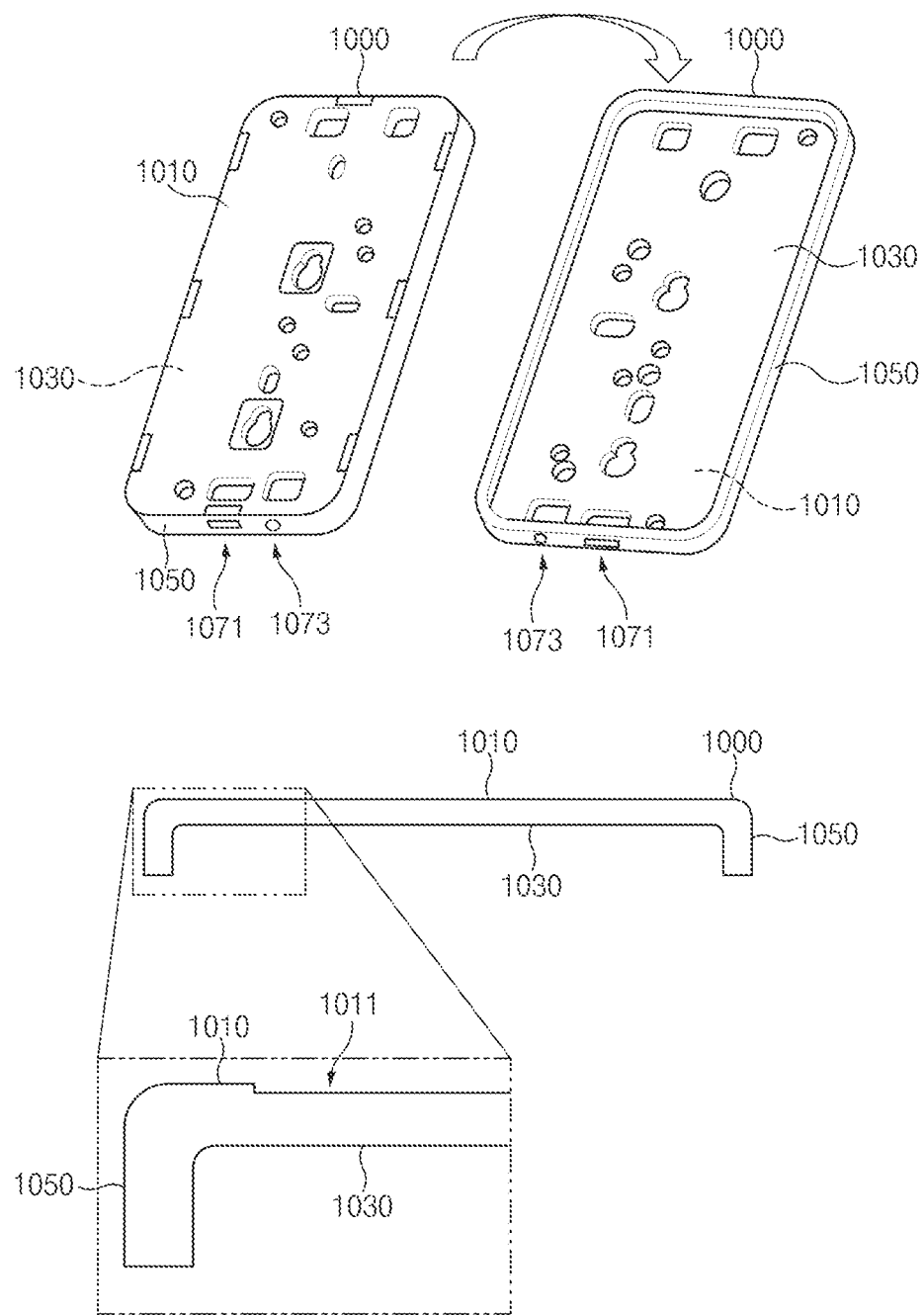

In addition, the side surface 1050 of the housing 1000 may be surface milled using the CNC-machining, as shown in FIG. 10C. Through this, an interface hole (e.g., a USB hole 1071, an ear jack hole 1073, and the like) may be defined in the side surface 1050 of the housing 1000.

Figure 10D:
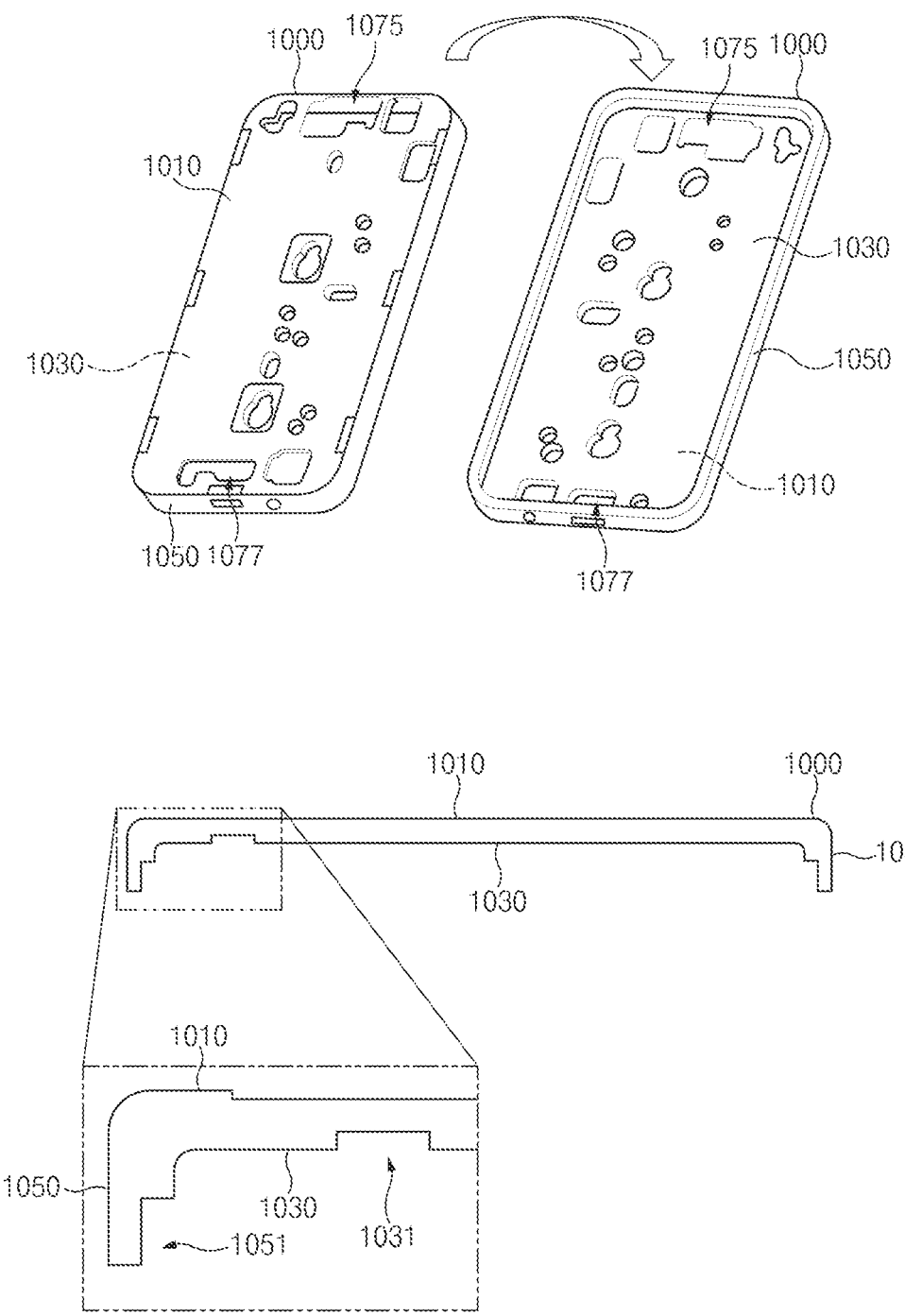

An inner side of the rear surface 1030 of the housing 1000 may be machined using the CNC-machining, as shown in FIG. 10D. For example, the rear surface 1030 may be machined to form injection-molding portion coupling faces 1031, 1051 on the rear surface 1030 of the housing 1000. Further, a shape for an antenna portion may be provided on the rear surface 1030 of the housing 1000. For example, a shape 1075 for a first antenna may be provided at a top of the rear surface 1030, and a shape 1077 for a second antenna may be provided at a bottom of the rear surface 1030.

Further, an inner side of the front surface 1010 of the housing 1000 may be machined using the CNC-machining, as shown in FIG. 10E. Through this, a receiving portion 1013 on which the display is received may be provided on the front surface 1010 of the housing 1000. Further, a segment portion may be machined on the housing 1000.

Figure 10F:
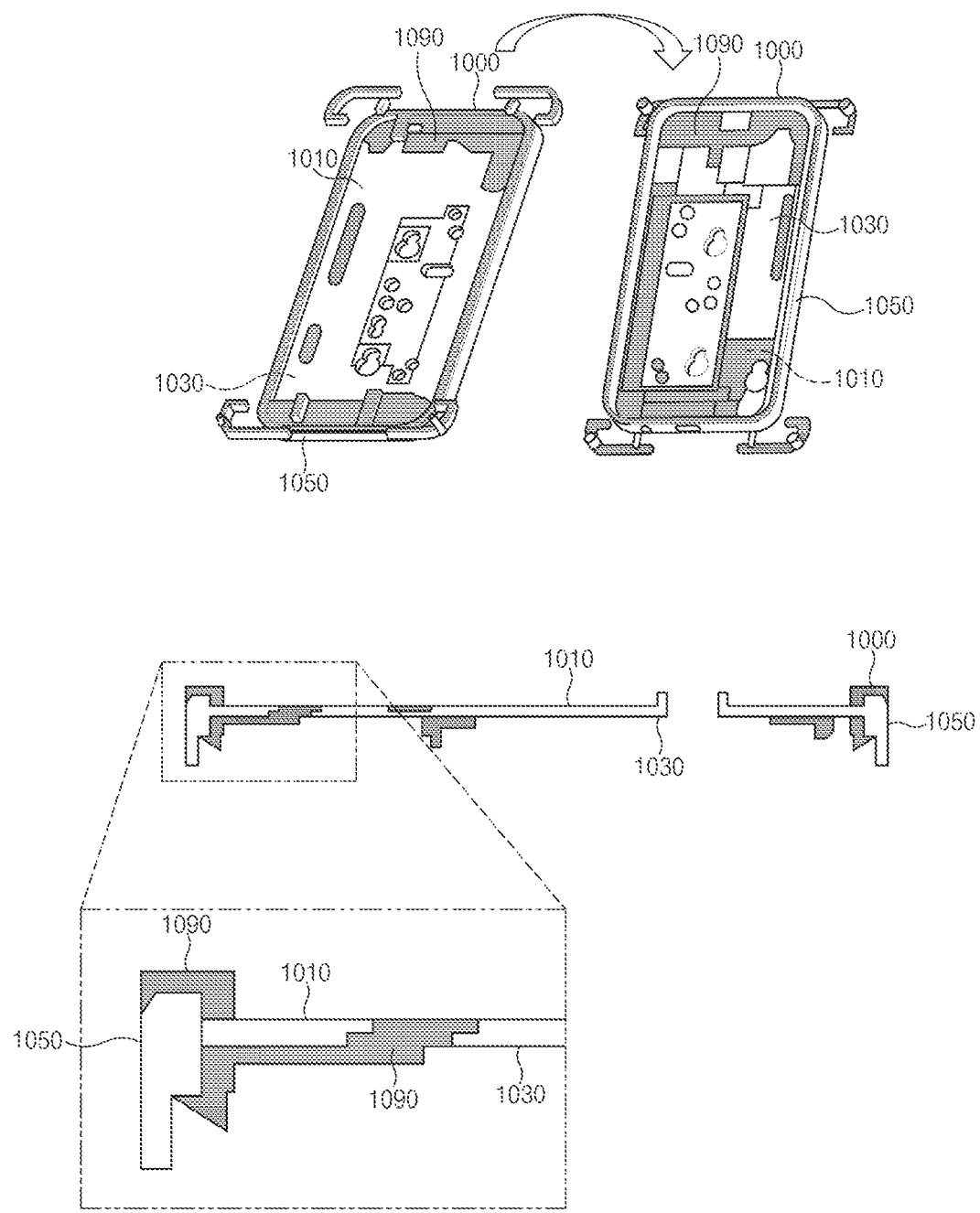

Thereafter, using an insert injection process, an organic material 1090 (e.g., a polymer member) may be bonded to the housing 1000, as shown in FIG. 10F. This insert injection process may have an advantage of minimizing a machining using an internal shape injection process.

Figure 10G:
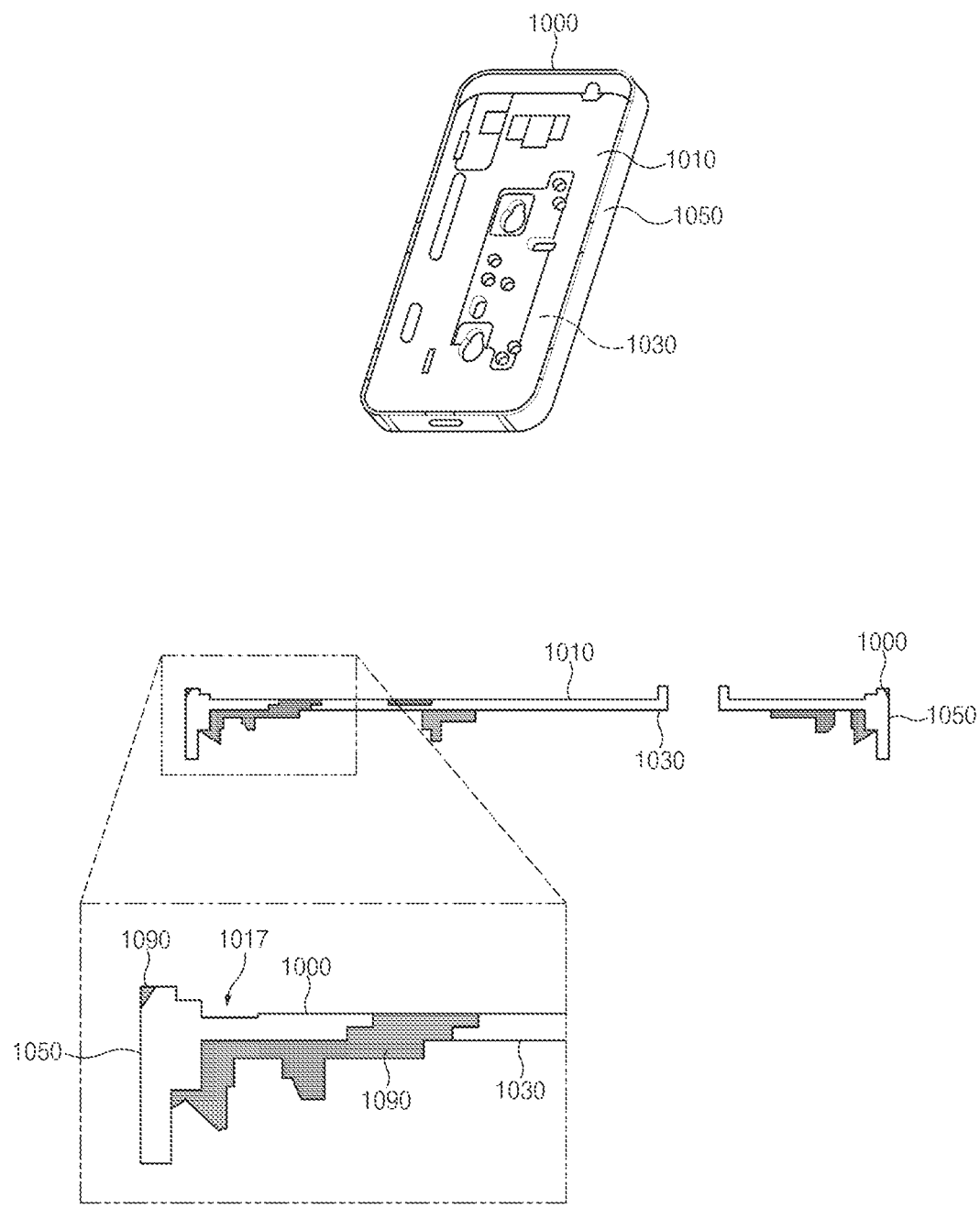
Figure 10H:
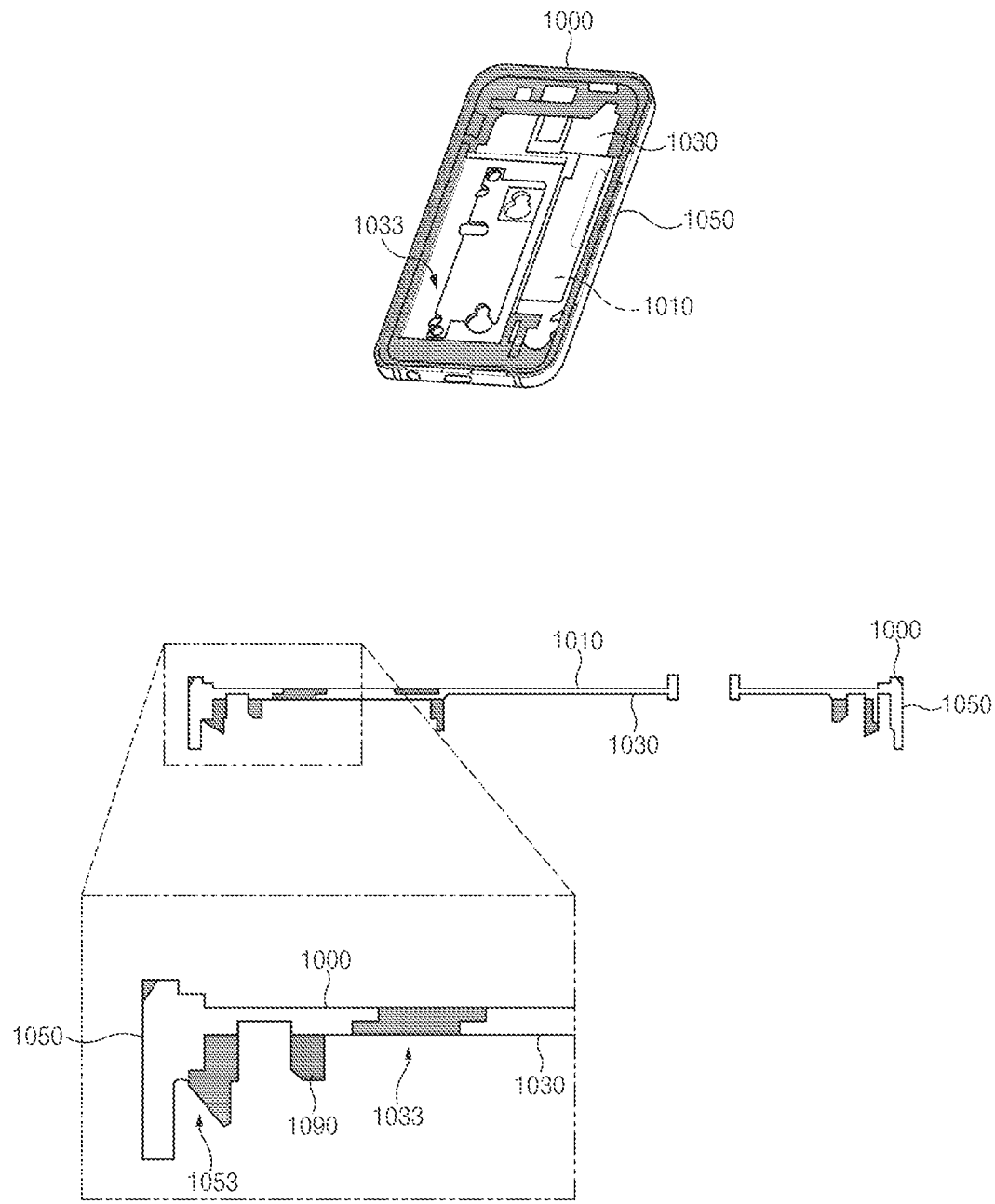
Figure 101:
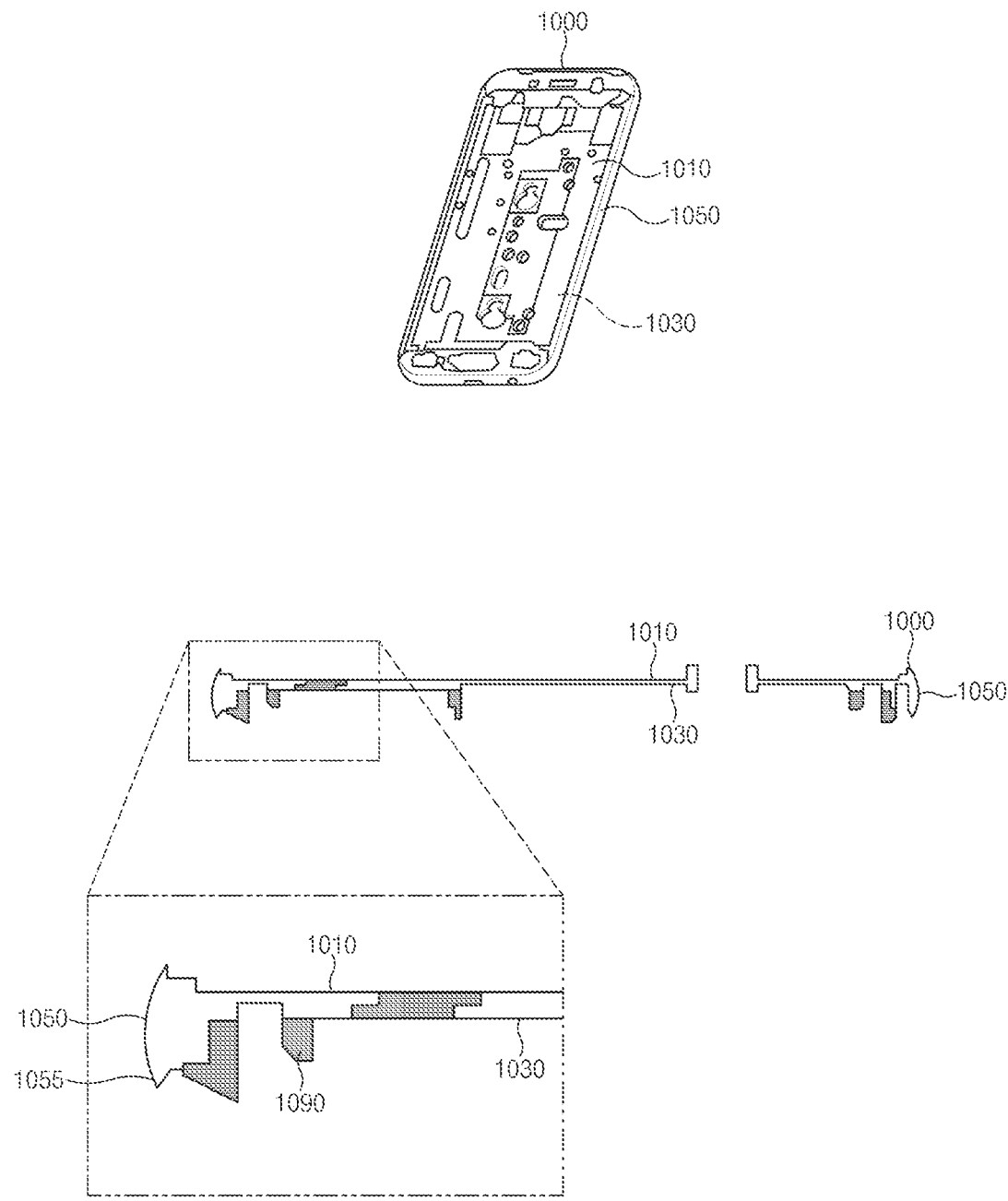

A receiving surface 1017 of the display may be machined using the CNC-machining on the housing 1000 subjected to the insert injection process, as shown in FIG. 10G. Further, as shown in FIG. 10H, a rear plate (e.g., a rear glass) receiving portion 1053 and a battery segment portion 1033 may be machined on the rear surface 1030 of the housing 1000 using the CNC-machining.

Figure 10J:
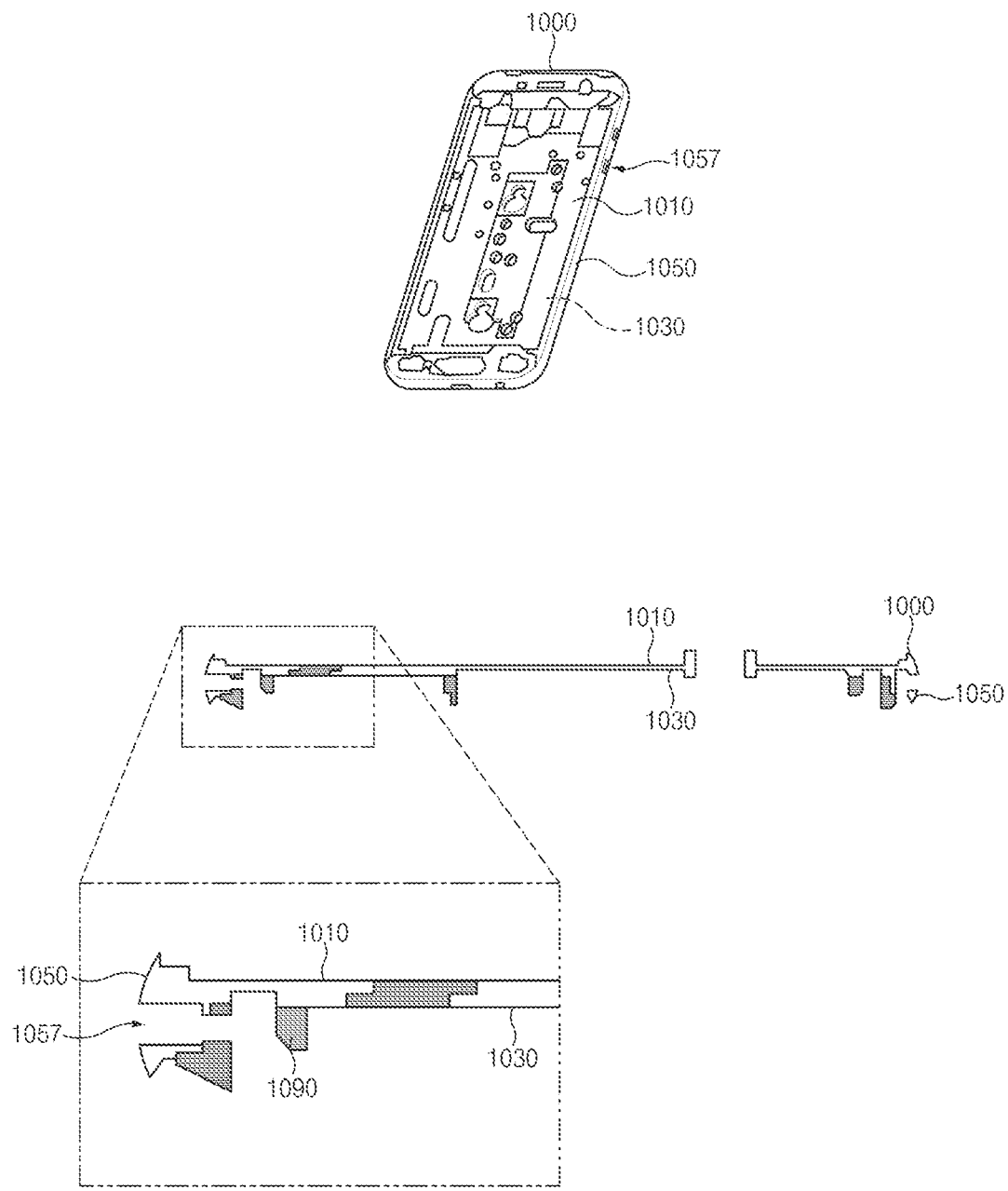

The housing 1000 may be CNC-machined for a profile of the side surface 1050, as shown in FIG. 10I. In one example, the housing 1000 may be machined such that the side surface 1050 includes a curved surface 1055. Further, as shown in FIG. 10J, a hole 1057 (e.g., a side key button hole, a card hole, and the like) may be defined in the housing 1000 using the CNC-machining.

Figure 10K:
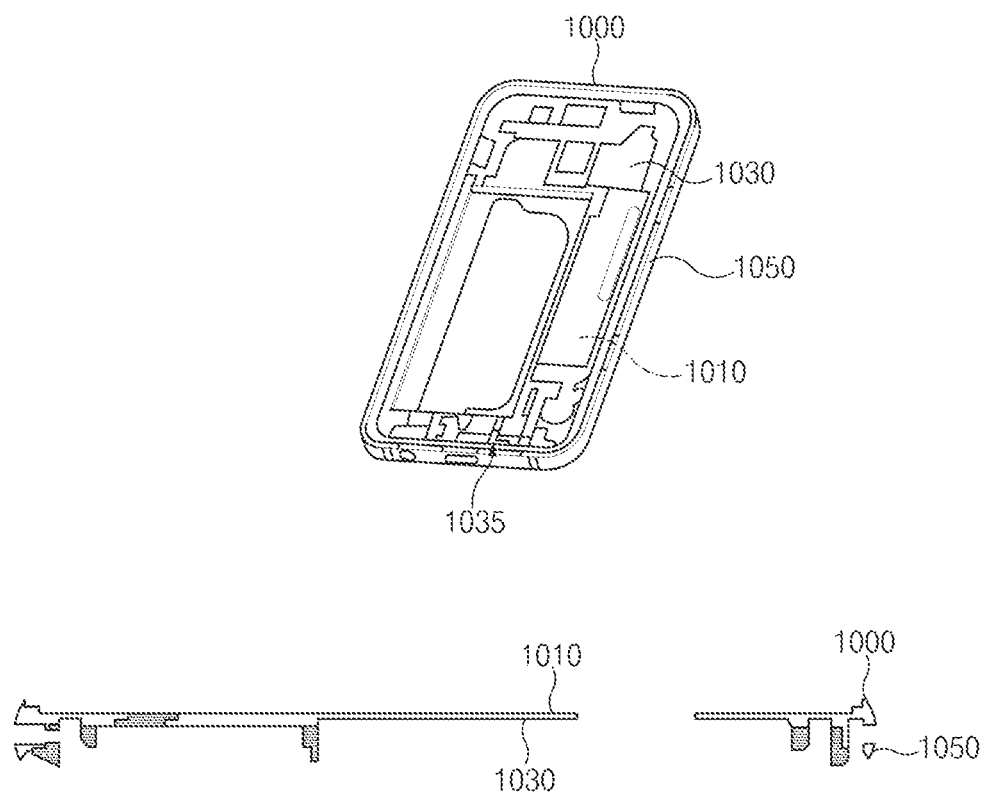

Thereafter, anodizing and coating processes may be performed. Further, the housing 1000 may be provided with an antenna contact portion 1035 using the CNC-machining, as shown in FIG. 10K.

As described above, according to various embodiments, a method for manufacturing a housing of an electronic device may include pressing a base material of a thin plate shape with a press mold, CNC-machining a housing provided from the pressing step at least one time, bonding a polymer member to the housing using an insert injection process, and attaching a rear plate to the polymer member. The housing subjected to the CNC-machining at least one time may include a first surface facing in a first direction, a second surface facing in a second direction opposite to the first direction, and a side member surrounding a space between the first surface and the second surface. The side member may include a first surface whose at least a portion substantially faces in the second direction, and at least one trench extending from the first surface toward the first direction. The polymer member may be located in the space and may extend in parallel to the at least one trench to be in contact to at least a portion of the side member. The polymer member may include the second surface substantially facing in the second direction. In addition, the rear plate may be attached to the second surface.

According to various embodiments of the disclosure, the method for manufacturing the housing may further include attaching an adhesive layer between the second surface and the rear plate.

According to various embodiments of the disclosure, the adhesive layer may include a waterproof tape.

According to various embodiments of the disclosure, the CNC-machining of the housing may be performed such that the at least a portion of the side member includes a first portion between the at least one trench and an outer surface of the side member, a second portion between the at least one trench and the space, a through-hole defined in the first portion in a third direction perpendicular to the first direction from the outer surface of the side member to the at least one trench, and a depression defined in the second portion and extending from the at least one trench for facing in the third direction.

According to various embodiments of the disclosure, the method for manufacturing the housing may further include inserting a mechanical button structure from the outer surface of the side member through the through-hole into the at least one trench.

According to various embodiments of the disclosure, the bonding of the polymer member to the housing may further include bonding the polymer member such the polymer member defines a closed loop along the side member.

The electronic device according to various embodiments disclosed in the disclosure may be various types of devices. The electronic device may include, for example, at least one of a portable communication device (e.g., a smart phone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "coupled," or "coupled," to another component (e.g., a second component), it may be directly coupled or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. In addition, the module may be constituted by, for example, an application-specific integrated circuit (ASIC).

Each component (e.g., the module or the program) according to various embodiments may include at least one object, and a portion of the above sub-components may be omitted, or additional other sub-components may be further included. Alternatively or additionally, some sub-components may be integrated in one component and may perform the same or similar functions performed by each corresponding components prior to the integration. Operations performed by a module, a program, or other components according to various embodiments of the disclosure may be executed sequentially, in parallel, repeatedly, or in a heuristic method. Also, at least some operations may be executed in different sequences, omitted, or other operations may be added.

According to various embodiments of the disclosure, the housing is manufactured using the base material having a small thickness such that the manufacturing cost and the manufacturing time may be reduced.

In addition, various effects may be provided that are directly or indirectly understood through the specification.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a front plate;
   a rear plate facing the front plate;
   a side member extending along a first edge of the front plate and a second edge of the rear plate, the side member comprising a first surface facing the rear plate, a metal part forming a portion of the surface of the electronic device and a portion of the first surface, and a polymer part forming another portion of the first surface and coupled to the metal part;
   a mechanical button coupled to the side member; and
   a waterproof member positioned between the rear plate and a first area of the polymer part included in the first surface, the waterproof member extending along an extension direction of the side member to form a closed curve when the first surface is viewed from above,
   wherein the side member comprises a first portion in which a through hole at least partially penetrating the metal part is formed, and the mechanical button is at least partially positioned inside the through hole,
   wherein the first portion comprises a second portion provided with a trench recessed in a direction toward the front plate on the first surface, and a third portion which is a peripheral portion of the second portion, and
   wherein when viewing the first surface from above, at least a portion of the mechanical button is visible through the trench.

2. The electronic device of claim 1, wherein at least a portion of the trench is covered by the rear plate.

3. The electronic device of claim 1, wherein the through hole included in the second portion intersects the trench.

4. The electronic device of claim 1,
   wherein the through hole included in the second portion does not penetrate the polymer part, and
   wherein the through hole included in the third portion penetrates a portion of the polymer part.

5. The electronic device of claim 1, wherein the trench opens towards the rear plate.

6. The electronic device of claim 1, wherein when the first surface is viewed from above, the mechanical button included in the second portion is positioned within the trench.

7. The electronic device of claim 1, wherein at least a portion of the trench is formed in the first area of the polymer part.

8. The electronic device of claim 1, wherein the trench penetrates at least a portion of the waterproof member.

9. The electronic device of claim 1, wherein when the first surface is viewed from above, the waterproof member is provided to surround the edge of the trench.

10. The electronic device of claim 1, wherein a portion of the polymer part forms a first inner wall of the trench.

11. The electronic device of claim 10,
    wherein the mechanical button included in the second portion faces the first inner wall, and
    wherein the mechanical button included in the third portion penetrates through the first inner wall.

12. The electronic device of claim 1, wherein the second edge of the rear plate is partially received in the trench.

13. The electronic device of claim 1,
wherein the mechanical button comprises:
   a support portion corresponding to the second portion and the third portion of the side member, and
   a pressing portion corresponding to the third portion and protruding from the support portion, and
wherein the pressing portion extends through the polymer part.

14. The electronic device of claim 13, further comprising:
a key bracket at least partially facing the polymer part; and
a switch module disposed on the key bracket,
wherein the pressing portion is configured to press the switch module.

15. The electronic device of claim 13, wherein when the first surface is viewed from above, a portion of the support portion is visible through the trench.

16. The electronic device of claim 13, wherein the portion of the support portion viewed through the trench includes end portions of the support portion.

17. The electronic device of claim 14,
wherein the trench comprises a first trench and a second trench spaced apart from the first trench in the extension direction of the side member, and
wherein the mechanical button is configured that:
   at least a portion of a first end portion of the support portion is positioned inside the first trench,
   at least a portion of a second end portion of the support portion is positioned inside the second trench, and
   the pressing portion protrudes from an area of the support portion between the first end portion and the second end portion of the support portion.

18. The electronic device of claim 17, wherein the switch module is disposed to correspond between the first trench and the second trench.

19. The electronic device of claim 1, wherein the waterproof member includes an adhesive layer.

20. The electronic device of claim 1, wherein the waterproof member includes a waterproof tape.

* * * * *